United States Patent [19]

Kume

[11] Patent Number: 4,706,246
[45] Date of Patent: Nov. 10, 1987

[54] DIGITAL SIGNAL TRANSMISSION SYSTEM
[75] Inventor: Hiroshi Kume, Kanagawa, Japan
[73] Assignee: Fuji Xerox Co., Ltd., Tokyo, Japan
[21] Appl. No.: 758,004
[22] Filed: Jul. 23, 1985
[30] Foreign Application Priority Data Jul. 23, 1984 [JP] Japan .................................. 59-152375
Jul. 23, 1984 [JP] Japan .................................. 59-152376

[51] Int. Cl.[4] .............................................. H04B 9/00
[52] U.S. Cl. ........................................ 370/85; 370/89; 370/94
[58] Field of Search ............................ 370/85, 94, 89; 340/825.51

[56] References Cited
U.S. PATENT DOCUMENTS 4,502,137 2/1985 Tan ........................................ 370/85
4,535,450 8/1985 Tan ........................................ 370/94

Primary Examiner—Benedict V. Safourek
Assistant Examiner—L. Van Beek
Attorney, Agent, or Firm—Sughrue, Mion, Zinn, Macpeak & Seas

[57] ABSTRACT

A digital signal transmission system for communicating digital signals in both a Faxnet and a CSMA/CD mode over a single cable. The system includes plural stations coupled to the single cable via taps, the stations transmitting time-division multiplexed digital signals on the cable with fixed time positions assigned to the signals within periodically repeated time base frames, which frames are subjected to further divisions so that individual ones of the stations transmit packets which occupy specific time periods in the frame. A send logic circuit prevents stopping of digital signal transmission from a station even if a collision occurs with a signal transmitted from the station in the CSMA/CD mode while a receive logic circuit prevents stopping of digital signal reception even if a collision is detected after start of digital signal reception.

11 Claims, 44 Drawing Figures

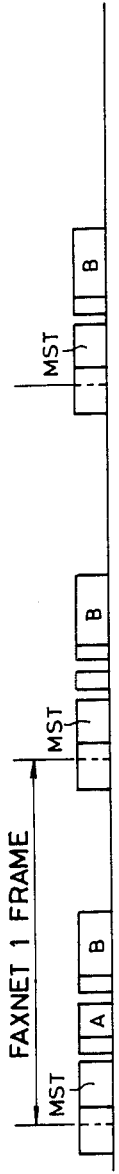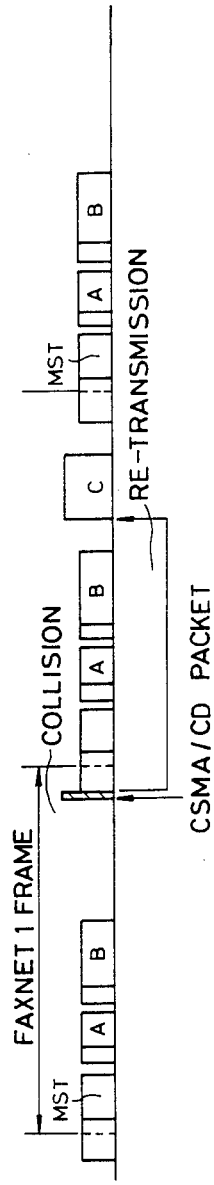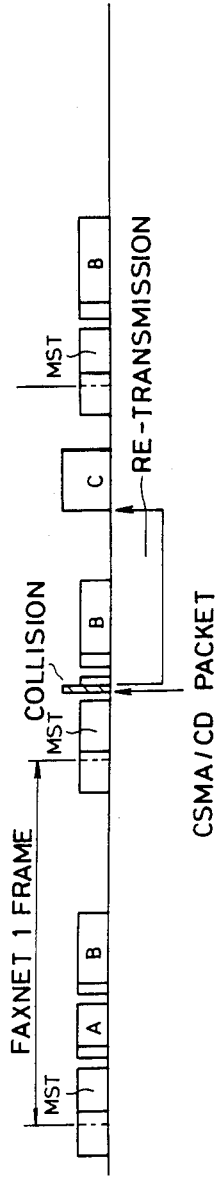

DIGITAL SIGNAL TRANSMISSION SYSTEM

BACKGROUND OF THE INVENTION

The present invention concerns a digital signal transmission system for data communications in the time division multiplex mode.

Wide use of electronic computers and development of digital signal processing technology have led to much attention being focussed on data communications in which telecommunications and data processing systems are combined, creating a demand for on-line data processing. In particular, much attention is focussed on the small-scale, packet-type private telecommunications systems in private and governmental offices using coaxial cables for communications and known for their economy, reliability, and high transmission efficiency.

In the packet-type telecommunications systems, the cable for two-way transmission is laid in, for instance, a research station to which a large number of individual terminals (stations) are connected. Each of these individual terminals transmit messages split into, for example, 1000- to 2000-bit data blocks. These messages include the address of the destination besides transmission and other headers.

In this type of transmission, the network itself has no controlling function and is a passive transmission medium. Control is completely distributed among the different individual terminals. As a result, an individual terminal can start message transmission only after checking that the transmission route is not occupied. Stations at the two ends of transmission route must stop communication if this communication causes a collision with another packet. The stations which stop communications retry transmission of their messages after waiting a predetermined interval. This is referred to as an CSMA/CD-type packet switching communications system.

In this type of communications system, the users at the respective terminals can not only access a computer, but also are equipped with hardware-like storage devices and software in the form of programs, etc. In other words, in this type of communications system, devices such as high-speed or high-density printers or large-capacity files that tend to be concentrated around a large computer in a time-sharing system (TTS) are distributed among the individual personal stations. Besides making it possible to economize on resources and increase the efficiency of utilization, this type of communications systems holds out possibilities for developing large software systems in which programs and data can be interchanged. Another characteristic of this type of communications system is that it assigns low relative priority to the various terminals, all stations being treated alike. It does not, therefore, insist on a master-slave hierarchy as is commonly encountered with other communications systems, making communications possible between any two connected. In addition, because the transmission lines formed by the coaxial cables comprise passive circuits only, it is easy to achieve high reliability with this system.

Despite the above advantages, a collision of packets along the transmission line is likely in this system because the respective stations can start transmission of data at any time desired. The higher the utilization of the transmission channel in the system, the more likely is the occurrence of collisions between packets.

To solve this problem, signal transmission systems such as the well-known priority-type "Ethernet" system or the reservation-type Ethernet system have been proposed. In the priority-type Ethernet system, a preamble in each respective packet is set with signal transmission priority data for the respective station. If two packets collide, only the packet with higher priority is transmitted. In the reservation-type Ethernet system, a station (master station) is permanently installed for mode specification, checking in the reservation mode whether or not the other stations (personal stations) have signals to transmit, and also checking the quantum of the data to be transmitted. In this way, for each frame, a packet transmission sequence is determined for the respective stations, and signals are transmitted on the basis of time division in the transmission mode.

However, in the priority-type Ethernet system, problems remain because packets can be assigned the same priority due to transmission delays. Accordingly, this method is not suitable in real-time transmission involved in, for instance, conversation-type audio communications, where importance is attached to real-time transmission and reception. In the reservation-type Ethernet system also, the above-mentioned inter-station correspondence is lost because of the existence of the master station. In other words, if there is a failure in the master station, data cannot be communicated any more. This affects the reliability of the system.

An improvement on these systems is the "Faxnet" system, a line switching communications system, which is illustrated in FIG. 1.

In the communications system illustrated in FIG. 1, a coaxial cable 1, provided as transmission line, is connected at its two terminal points to impedance-matching terminators 2 having resistance values equal to the characteristic line impedance. The respective stations are connected to the coaxial cable 1 via T connectors (taps) $3_1$-$3_N$. Basically, all stations have the same configuration, and hence, in this figure, only the constituent elements of a station A connected to the connecter $3_1$ are shown.

Each station is equipped with a user device 4 and a computer and a telephone. The user device 4 is provided with a transmitter (encoder) 41 to transmit to other stations digital signals in units of packets, a receiver (decoder) 42 receiving digital signals from the other stations, again in units of packets, and a terminal controller 43 to control the terminals. Output signals from the transmitter 41 are temporarily stored in a transmission buffer memory 51 and are read at a specified time on the basis of a clock signal of a frequency determined by the bit transmission rate on the coaxial cable 1 constituting the transmission medium. The signals read out are converted to packets by a sending logic circuit 52. After the signals pass a transmission buffer amplifier 53, they are sent to the coaxial cable 1 via the T connector $3_1$.

All the packet signals transmitted across the coaxial cable 1 are received via the T connector $3_1$ by a reception buffer amplifier 54. From the packets received at a reception logic circuit 55, only packets addressed to the local station are selected and temporarily stored in a reception buffer memory 56. The receiver 42 continuously reads the stored signals on the basis of a specific clock. In this way, the reception output signals are obtained.

While the signals are transmitted and received in this way, a transmission clock a used for the purpose is generated by a transmission clock generator 57. A transmission control circuit 61 controls the terminal controller 43 in response to the received signals addressed to the local stations and obtained from the circuit 55. At the same time, a transmission control circuit 61, following instructions from a terminal controller 43, controls the sending logic circuit 52. A collision detection circuit 62 detects whether or not a collision has occurred with the packet signal from another station at the time of transmission of packet signals.

In addition, each station is provided with a frame control circuit 80, $t_1$ timer circuit 81, and packet control circuit 82.

As shown in FIGS. 5 and 6, the frame control circuit 80 receives a bit clock a (having more or less the same frequency as the transmission clock generator 57), and a master detection signal f and master reset signal g from a receive logic circuit 55, and generates a frame clock h and a master window signal i. When master detection signal f is on, this circuit generates a pulse of the frame clock h and master window signal i in response to a master reset signal g, whereas, when the master detection signal f is off, the trigger pulse generated within the circuit causes generation of the frame clock h and master window signal i pulses.

The $t_1$ timer circuit 81 detects the presence of a station that has completed packet transmission. When it receives as an input a pulse of the receive signal j and the frame clock h, it starts the timer in response to the pulse of the frame clock h when the receive signal is on. If the receive signal is not on a time $t_1$ after the start of the timer, it issues a time-out signal k. Again, if the time-out signal k issues, the $t_1$ timer restarts and checks the occurrence of the following packets.

As FIGS. 8 and 9 show, the packet control circuit 82 receives the frame clock h, receive signal j, and time-out signal k from the $t_1$ timer circuit 81. A send control signal l issues when the packet transmission sequence from the local station is detected from the input signals. This output signal is supplied to the transmission control circuit 61 where the send request signal is generated for transmission to the send logic circuit 52, control being exercised together with the transmission signal from the controller of the terminal unit. Also, for each frame, the local station transmission sequence is checked for the next frame transmission and the data is stored in the memory.

Details of the frame control circuit 80 are shown in FIG. 5. As seen in this figure, the frame control circuit 80 consists of a bit counter 90, flip-flop 91, and a number of gate elements. The bit counter 90 counts bit-clock pulses, generating, as mentioned earlier, the frame clock signal h according to the status of the master detection signal f and master reset signal g. This signal frame clock signal h is fed to a set input S of the flip-flop 91, whereby the master window signal i is obtained from the Q output of flip-flop 91. Operations of the frame control circuit are clear from the timing chart in FIG. 6. The relation between the frame clock output from this circuit and the packet signal on the transmission line is shown in FIG. 7.

As shown in FIG. 8, the packet control circuit 82 consists of a packet sequence memory 100, packet counter 101, $t_1$ time-out output counter 102, comparator 103, an adder 104, flip-flop 105, and AND gate 106.

The packet sequence memory 100 stores the scheduled sequence of transmission from the local station. The packet counter 101 counts the number of packets within a frame. The $t_1$ time-out output counter 102 counts the time-out output from the $t_1$ timer. The adder 104 is used to add the number of packets and the number of time-out outputs from the $t_1$ timer. The comparator compares the sum output from the adder with the packet sequence number in the memory, and issues an output signal according to the frame clock h when the sum reaches a value immediately before the packet sequence number.

The following is a detailed explanation of the transmission control in this system:

I. FIG. 10 shows the transmitter packet of the station that starts transmission after a transmission line silent time. In this instance, packets are transmitted in the following sequence:

(1) Carrier sense is monitored once within the span of a frame, and if there is no carrier sense output, packets are transmitted in a cycle determined by local station frame clocks. A flag is set in the control field of the transmitted packet to indicate that it is the master packet. The control field is also provided with an area for storage of packet sequence data. This area may carry data to indicate that this is the #1 packet.

(2) If the first packet transmitted does not collide with a packet from some other station, packets are transmitted according to the frame clock.

(3) If the initial packet meets with a collision, a back-off is executed and carrier sense is monitored for a frame immediately before packet transmission, and the packet is retransmitted according to whether there is or is not a carrier present.

II. If there is a signal on the transmission line, the operation proceeds as follows (FIG. 11):

(1) The master packet is detected and the packets thereafter, including the master packet, are counted by the packet counter, and the resulting count value is stored in the packet count memory as soon as the master window is detected in the next frame.

(2) Blank areas are detected and a check is made to evaluate if the following conditions are satisfied:

Empty area $\geq$ (packet size + 2a + $\alpha$).

(Empty area detection is described later).

(3) If the check in (2) shows the occurrence of an empty area, in the next frame the number of packets from the master packet is counted, and, when the number of packets stored in the memory during the last frame is reached, carrier sense off is detected for the packet and packets are transmitted from then for a total period of $\alpha$. For example, as shown in FIG. 11, the #3 packet is detected in each frame, and the packet is transmitted after a time $\alpha$ from the moment its carrier sense goes off (local station = C station).

(4) If a collision occurs outside the priority window after packet transmission, a reset is performed and the operation is retried.

When the local station sends a packet, procedure III below is followed if there is a station that has completed transmission:

III. If there is a station that has completed packet transmission (FIG. 12):

(1) Each station is equipped with a frame clock and timer to count time $t_1$, this counter being started when the carrier sense goes off in each packet. This timer is reset at a frame clock pulse when carrier sense goes on, and, if it is not reset until time $t_1$, a $t_1$ time-out occurs, followed by an automatic restart. Thus, $$t_1 = 2a + \beta (\alpha > \beta).$$

(2) When a station detects that, counting from the master packet, the number of packets is equal to the value immediately preceding the packet number to be sent by that station, it sends a packet at time $\alpha$ thereafter. If there is no packet immediately before, the timer $t_1$ will time out, and, a time $\alpha$ after this time-out is detected, a packet will be transmitted.

(3) The packet counter in the respective stations calculates the number of packets (including the master packets) for each frame, starting from the master packet and continuing up to that of the particular station in packet transmission sequence. For example, in FIG. 12, the packet counter counts two for station B and three for station C over the frame F(n). If a station ends transmission somewhere within the interval between transmission of the master packet and the time when the turn comes for this station to transmit its packet, and this difference is the value by which the packet counter of the station falls short of the count for the preceding of the station falls short of the count for the preceding frame. Thus, in the subsequent frame, the revised packet transmission sequence will be conformed for packet transmission. For stations that do not transmit any packets, the packet counter counts the number of packets occurring between and including the master packets.

IV. When no further master packet remains to be transmitted (FIG. 13):

(1) Each station monitors the master packets, and if it cannot detect a master packet in the position where it is expected in a frame, it continues thereafter to monitor for the presence of a master packet until the time comes for packet transmission by the station. If no master packet is found, a master flag in the packet transmission by the station is set a time $\alpha$ after the $t_1$ timer times out, and then a packet is transmitted.

(2) The station which becomes the master in the next frame follows its own frame clock and transmits a master packet at the position for the #1 packet.

V. Detection and check of master packets (FIG. 14):

(1) If a master packet is detected, the master window timer is started from a specified point in the master packet (such as the end of the control field or the end of the packet).

(2) The master window is generated in the position where the master packet is to appear in the next frame. The master packet position changes after the transition of the master packets across the master window span within which the $t_1$ timer output can be detected. The master flag is set so that it can be detected even under worst-case conditions.

(3) Each station checks the presence (or absence) of the master flag, carrier, and a time-out output of the $t_1$ timer within the master window.

(4) If the time-out output of the $t_1$ timer is absent, or if a master flag or carrier sense on is detected within the master window, the corresponding packet is treated as the master packet and the master window timer is reset then restarted at a specified location in the master packet, as described in (1) (a in the figure).

(5) If a $t_1$ timer time-out is detected within the master window, or if the carrier sense goes off, the master packet is considered to be absent, and the periodic timer is restarted from the end of the master window (b in the figure). In this case, the end of the master window must be made to coincide with the reference point specified in (1).

VI. Detecting empty areas (FIG. 15):

(1) Each station detects the master packets, and, when carrier sense in a master packet goes off, it starts the empty area detection counter (a in the figure).

(2) If a packet occurs in the interval up to detection of the master window of the next frame, the counter is stopped when carrier sense of the packet goes on (b in the figure), and is reset and is started when carrier sense goes off.

(3) If a master window is detected, the counter is stopped and the value contained in the counter at that moment is read (c in the figure). This value gives the empty area.

The above is a description of the Faxnet transmission control system. The following is a description of the signals used in that system.

The value a represents the transmission delay period between stations where the delay occurs.

The time $\alpha$ is a value, determined according to hardware considerations, employed to maintain the necessary interval between the packets. In other words, this time is determined by the time required after passing the last bit of the packet in the channel for the channel to recover its silent voltage level and the time required by the receive logic circuit in the other station for recovery to the reception enable status upon processing the received packet.

Provision is made to avoid overlapping of a packet with the master packet at the head of the next frame where an attempt is made to access the channel at the end of a frame in (2), II (1). In other words, as seen in FIG. 7, the remaining frame time must be equal to the packet size $+2a+\alpha$. The expression in II (2) gives the limiting conditions determined accordingly.

The value $2a+\beta$ for time $t_1$ in (2), III, is determined as follows:

Let it be assumed, in FIG. 2, that the last station on the cable has transmitted the m-th packet and that the opposite station (at the other end of the cable) has transmitted the (m+1)-th packet. In this case, all the stations will definitely detect the initial bit of the m-th packet in time $2a+\alpha$ from the detection of this packet by the (m+1)th packet.

If this cannot be detected, that is, if silence prevails even after time $2a+\alpha$, all the stations will understand that the (m+1)-th packet has ended. This will make the (m+2)-th packet occupy the position of the (m+1)-th packet in the sequence, and thus the sequence of the following packets is advanced by one position each.

Furthermore, if $\beta > \alpha$ and $2a+\beta$ is greater than $2a+\alpha$, then silence over a period of $2a+\beta$ will imply silence over a period of $2a+\alpha$ as well.

Also, in this system, a packet must be at least $2a+\beta-\alpha$ in size. This limit on effective packet size is intended to restrict the delay in the transmission timing in the subsequent frame for a packet currently being tranmsitted in the preceding frame to not more than one frame type from the current frame. For example, as shown in FIG. 4, when the m-th packet ends, the (m+1)-th packet is transmitted after checking a silent period equal to (size of m-th packet)+$\alpha$ from the (m−1)-th packet in the preceding frame.

The following relation is necessary so that timing for the (m+1)-th packet is not delayed: packet size $+\alpha+2a+\beta-\alpha >$ packet size $2a+\beta-\alpha$.

At present, the CSMA/CD system is employed as an international standard for packet switching communications systems in local area networks. For this reason, communications system based on CSMA/CD are widely being used. However, CSMA/CD presents difficulties in real-time transmission, and is therefore not of advantage in audio/video data transmission. Faxnet, on the other hand, is a line switching communications system suitable for real-time transmission. Thus, if both the systems are used in parallel, all types of data may be transmitted while both reliability and high quality of communication are assured. However, if the two systems are made to coexist by connecting them through a single cable, the inherent differences in the two transmission systems cause collisions of packets as shown in FIG. 16, and hence this approach cannot be applied to real-time transmission. For this reason, to use a CSMA/CD packet switching communications system and a Faxnet line switching communications system in parallel, two cables must be used.

SUMMARY OF THE INVENTION

Accordingly, an object of this invention is to provide a line switching communications system by improving the conventional Faxnet transmission system by connecting it by a single cable to a CSMA/CD packet switching communications system without the above-discussed difficulties.

To attain the above object, a digital signal transmission system of the invention comprises a send logic circuit functioning to prevent stopping of digital signal transmission from the local station, even if this signal collides with a digital signal transmitted in the CSMA/CD mode within the station; a receive logic circuit functioning to prevent stopping of digital signal reception, even if a collision occurs midway after reception of this signal; a transmission time-out detection circuit generating transmission request signals to request unconditional transmission if signal transmission has not been possible over a frame after digital signal transmission; and a reception time-out detection circuit generating reception request signals to request unconditional starting of reception if no signal direction to the local station has been received over a frame after signals directed to the local station started being received.

Moreover, in a conventional Faxnet system, when a station ends transmission of a call, it stops transmission of packets and the empty area thus created (on a time basis) is detected by the other stations, whereby they identify the end of the call transmission. In the Faxnet system of the invention, on the other hand, wherein both the Faxnet and CSMA/CD methods of detecting empty area and informing of the end of transmission are employed on a single cable, there is possibility of CSMA/CD packets entering the empty area. There is possibility also of a late collision between this packet and the Faxnet packet transmitted due to the operation of the conventional Faxnet transmission time-out detection circuit. Late collision is a phenomenon that never occurs in the CSMA/CD system. (Late collision refers to a collision that occurs between CSMA/CD packets following passage through a collision window, namely, in which there is possibility of a collision where only CSMA/CD packets are being transmitted along the cable, the collision window being normally of a time duration double the transmission delay between stations farthest from each other).

Accordingly, another object of the invention is to provide a line switching communications system which improves the conventional Faxnet transmission system and which is used side by side with the CSMA/CD packet switching-type communications system in one cable without allowing late collisions between CSMA/CD packets.

In the Faxnet system of the invention, a station which completes transmission of call (that is, ends transmission of the last packet in a message) informs the end of the call by transmitting, during the next frame, a packet shorter than a specified length (FIG. 31). Furthermore, the master station transmits a dummy preamble to the terminating limit of the frame and the $CS_{OFF}$ time in the interval between a specified frame timing to the terminating limit of the frame (FIG. 31). In this way, transmission of a CSMA/CD packet fails if the packet is contained within a group of Faxnet packets transmitted periodically, immediately meeting with a collison and causing the transmission to stop, thereby avoiding occurrence of a late collision (FIGS. 32 and 33).

BRIEF DESCRIPTION OF THE DRAWINGS

FIGS. 31 to 33 are diagrams used for explaining the principles of a further embodiment of the invention;

DESCRIPTION OF THE PREFERRED EMBODIMENTS

Figure 17:
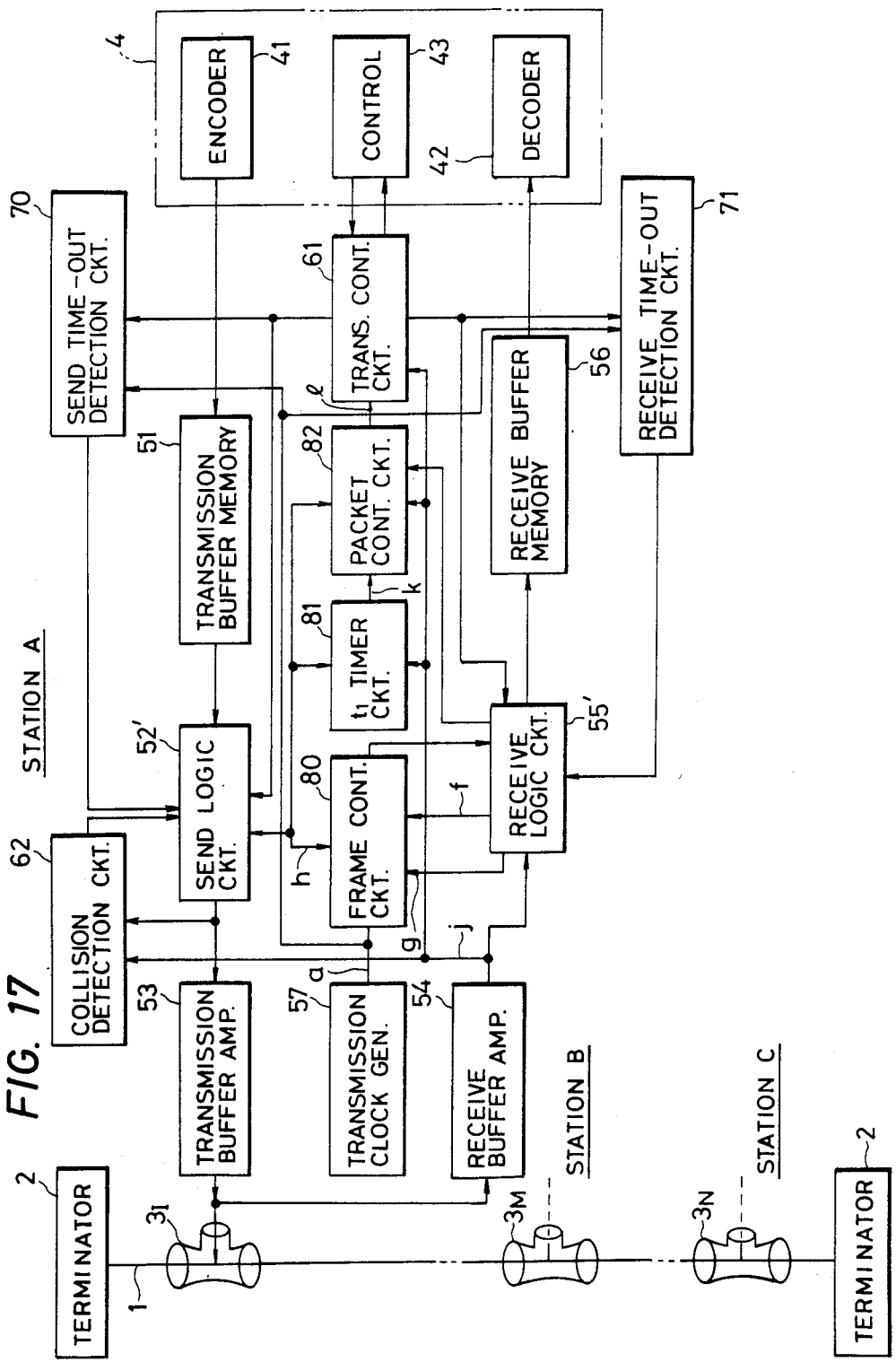
FIG. 17 is a block diagram of a first embodiment of the inventive communications system.

The following are the differences between the conventional Faxnet configuration and the first embodiment of the invention shown in FIG. 17. In the figure, 52' and 55' are, respectively, a send logic circuit and a receive logic circuit, which operates as the conventional send logic circuit 52 and the receive logic circuit 55 except for the following:

Send logic circuit 52':

(1) Transmission is not stopped even if $CD_{ON}$ is detected within the interval $2a+\tau_1+\tau_2$ from the start of packet transmission.

(2) If a send request signal is received from the send time-out detection circuit, even if the packet sequence does not coincide with the transmission sequence of the local station, or even if $CS_{ON}$ is detected, packets are transmitted as before.

Receive logic circuit 55':

(1) Packet reception does not stop even if $CD_{ON}$ is detected after packet reception starts.

(2) If a reception request signal is received from the reception time-out detection circuit, reception is continued. Normally this is done from the point at which CS goes on.

As employed herein, reception refers to the detection of preamble termination followed by reading of the subsequent destination address, and receiving the packet if it is addressed to the local station; $CD_{ON}$ ($CD_{OFF}$) refers to Collision Detect ON (OFF), meaning output of a collision detection signal from the collision detection circuit 62; and $CS_{ON}$ ($CS_{OFF}$) is an abbreviation for Carrier Sense ON (OFF), implying occurrence of signals on the cable. Furthermore, a represents the transmission delay time between stations situated farthest from each other, $\tau_1$ the time required by a CSMA/CD station to detect a collision, and $\tau_2$ the jamming signal time transmitted by a CSMA/CD station after a collision. The time period $2a+\tau_1+\tau_2$ is referred to as a priority window.

The transmission system of the invention is provided with a sending time-out detection circuit 70 and receiving time-out detection circuit 71. These detection circuits have the following functions:

Sending time-out detection circuit 70:

(1) counts transmission clock pulses from the frame clock generator and is reset in response to the send request signal from the transmission control circuit;

(2) issues a send request to the send logic circuit if it takes more than one frame for a send request signal to be received after the previous send request signal, that is, if more than one frame is counted; and (3) repeat the above operations until there are no more packets sent.

Receiving time-out detection circuit 71:

(1) counts transmission clock pulses from the frame clock generator and is reset in response to the packet detection signal from the receive control circuit to the local station;

(2) issues a receive request signal to the receive logic circuit if no packet detection signal addressed to the local station arrives after the previous packet detection signal arrival even after (1 frame$-\tau_0$), where $\tau_0$ represents the time from reception of the packet to the identification of the destination address;

(3) repeat the above operations until no more packets addressed to the local station are present.

Figure 18:
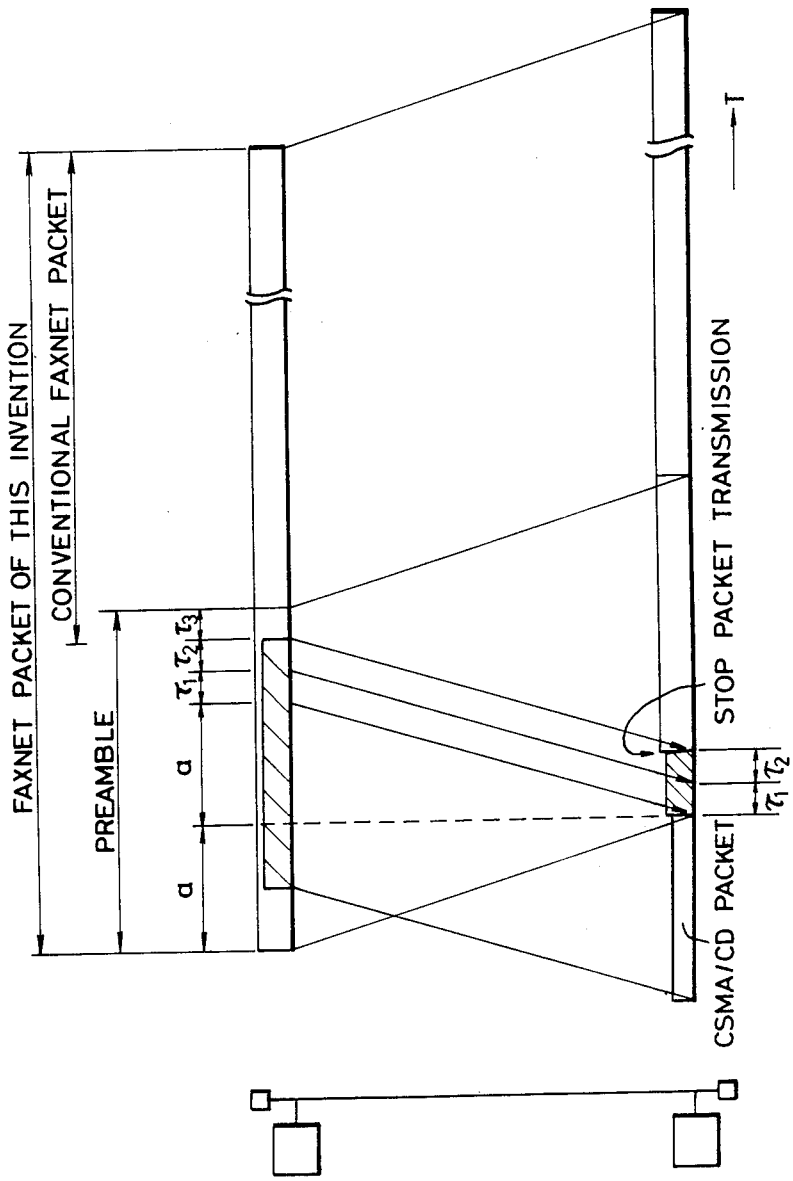
FIG. 18 is a diagram showing the stage when a packet in the inventive system collides with a CSMA/CD packet.
Figure 19:
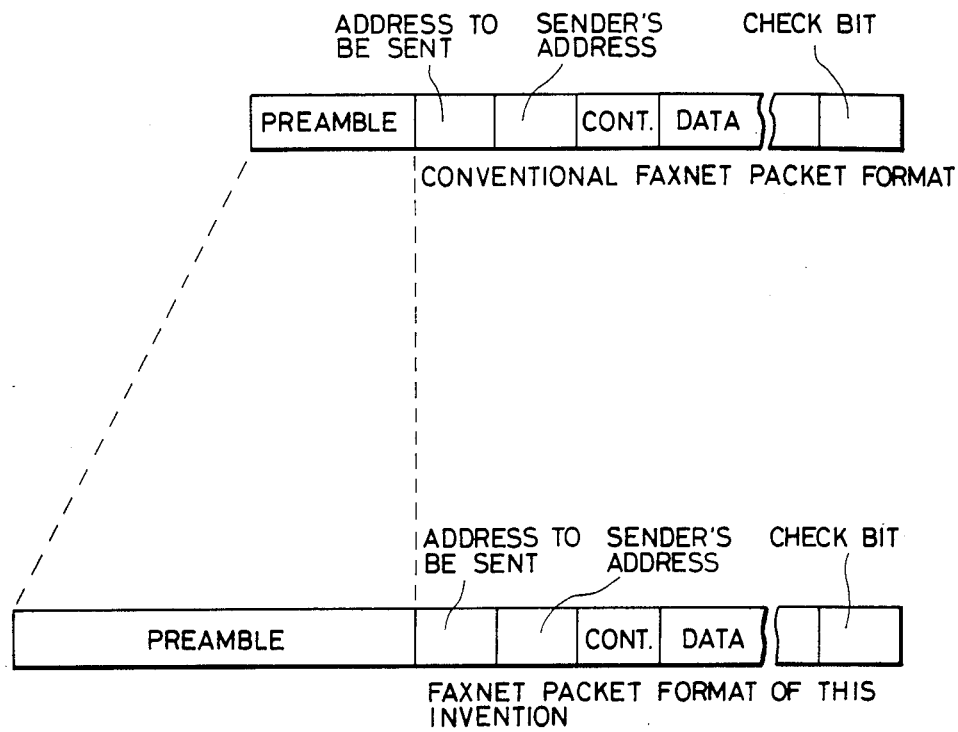
FIG. 19 is a diagram comparing a conventional communications system with the packet format of this invention.

In this way, the communications system of the invention provides the conventional Faxnet stations with a priority function in which priority is assigned to Faxnet packets over CSMA/CD packets during transmission. The CSMA/CD stations are configured to stop packet transmission after a time $\tau_1+\tau_2$ from the occurrence of a collision. The preamble of the Faxnet packets in accordance with the invention is made to have a duration of $2a+\tau_1+\tau_2+\tau_3$, where $\tau_3$ is the minimum preamble length for bit synchronization and stability of the reception circuit, so as to prevent destroying the field following the preamble (see FIG. 18). As a result, the preamble in the Faxnet packet format is made longer than in the case of the conventional system (FIG. 19).

Figure 20:
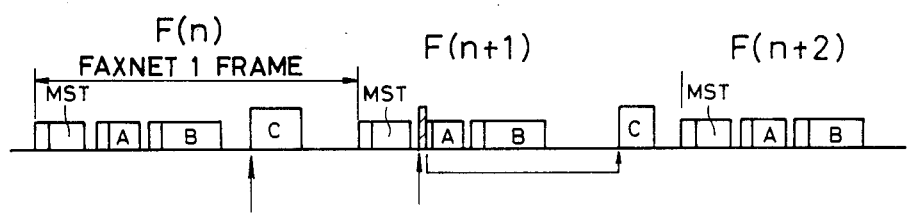
FIGS. 20 to 22 are diagrams showing the priority given to a packet in the invention over the CSMA/CD packet.
Figure 21:
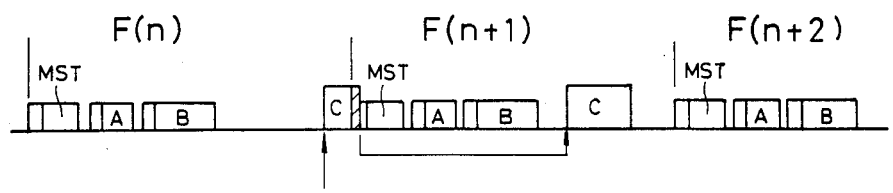
Figure 22:
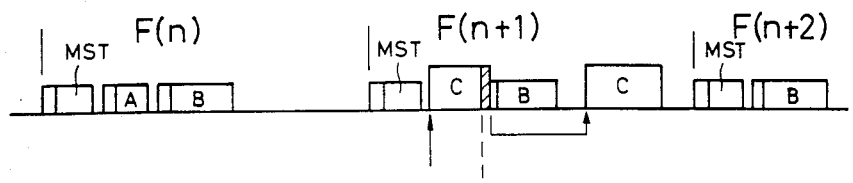

FIGS. 20 to 22 show how, in accordance with this invention, the Faxnet packets are transmitted by giving them priority over the CSMA/CD packets. In this figure, Faxnet packets are being transmitted by station MSP, A, and B, while CSMA/CE packets are being transmitted by station C.

In frame F(n) in FIG. 20, station C has successfully transmitted a packet to the empty area. In frame F(n+1), station C sends a packet following a packet from a station MST, which collides with a packet from station A. Station A successfully continues to send packets as before. Station C stops transmission of packets and then starts transmission once again.

Station C in frame F(n) appearing in FIG. 21 sends packets immediately before the transmission of packets from Station MST. Irrespective of $CS_{ON}$ or $CS_{OFF}$, the station MST sends packets once for each frame, these packets colliding midway with the packets transmitted by Station C. Station MST successfully continues transmission as before. Station C stops transmission and then later retransmits its packets.

It is assumed in FIG. 22 that, in frame F(n+1), station A stops transmission, and when the area occupied by the station A becomes empty, station C sends its packets. There is no problem as long as station C's packets are short, but if they are long, midway during their transmission, collision occurs because station B transmits packets once every frame, irrespective of the packet sequence and the presence or absence of $CS_{ON}$. Station B here successfully continues transmission as before. Station C stops transmission for a while and then retransmits its packets.

Figure 23:
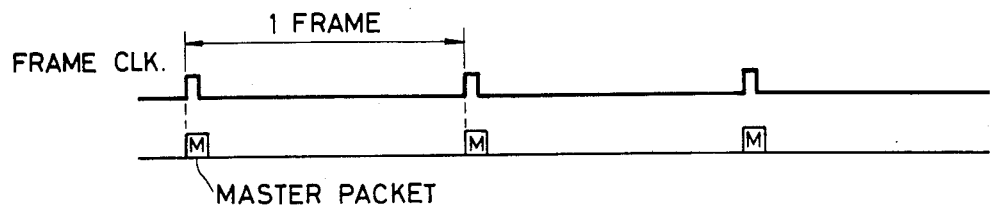
FIGS. 23 to 28 are diagrams used for explaining the theory of digital transmission underlying this invention.

The following describes transmission control in this system:

I. FIG. 23 shows the transmission packet of the station starting initial transmission when the transmission line is silent. In this instance, packets are transmitted in the following sequence:

(1) Carrier sense is monitored once within the span of a frame, and if there is no carrier sense output, packets are transmitted in a cycle synchronous with local station frame clocks. A flag is set in the control field of the transmitted packet to indicate that it is the master packet. The control field is provided with an area also for storage of packet sequence data. This area may carry data to indicate that it contains the #1 packet.

(2) If the first packet transmitted does not collide outside the priority window with a packet from some other stations, packets are transmitted according to the frame clock.

(3) If the initial packet meets with a collision outside the priority window, a reset is executed, carrier sense is monitored in a frame immediately before packet transmission, and the packet is retransmitted or not in accordance with the presence or absence of the carrier.

II. If there is a signal present on the transmission line, the operation proceeds as follows (FIG. 24):

II-1. If a master packet is detected:

(1) The master packet is detected and the packets thereafter, including the master packet, are counted by the packet counter, the count value being stored in the packet count memory as soon as the master window is detected in the next frame. (The master window is described later.)

(2) Blank areas are detected and a check is made to evaluate if the following conditions are satisfied:

Empty area=(packet size+2a+α).

(Empty area detection is described later.)

Figure 24:
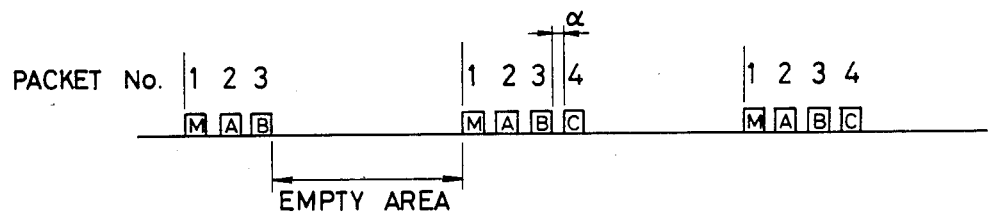

(3) If the check in (2) shows the occurrence of an empty area, in the next frame the number of packets from the master packet is counted, and, when the number of packets stored in the memory during the last frame is reached, carrier sense off is detected for the packet and packets are transmitted for a total period of α. For example, as shown in FIG. 24, packet #3 is detected in each frame and the packet is transmitted after a time α from the moment its carrier sense goes off (local station=C station).

(4) If a collision occurs outside the priority window after packet transmission, a reset is performed and the operation is retried.

(5) If a local station transmits a packet, the station that completes transmission performs procedure II at times.

II-2. If a master packet is not detected:

(1) The next frame is monitored and if no carrier sense output is found, procedure I is followed. If the master packet is detected, procedure II-1 is followed. If the master packet is detected, procedure II-1 is followed. If the master packet is not detected, the procedure from (2) onwards is followed. The purpose of monitoring one more frame is to eliminate the possiblity of failure to detect the master packet because of monitoring only one frame during the transition time at the master station.

(2) Packets are transmitted periodically according to the frame clocks from the local stations. A flag is set in the control field of the transmitted packet to indicate that the packet is a master packet. Otherwise, an area may be provided in the control field to indicate the packet sequence, indicating in this area that this is packet #1.

(3) If the initially transmitted packet does not collide with a packet from another station outside the priority window, a dummy preamble is transmitted according to the frame block, followed by transmission of the master packet.

(4) If the initially transmitted packet meets with a collision outside the priority window, a reset is performed, carrier sense is monitored over the frame immediately preceding the transmission of the packet transmission, and, depending upon whether a carrier is present or not, the procedure for packet retransmission is determined.

III. If there is a station that has completed packet transmission (FIG. 25):

(1) Each station is equipped with a frame clock and timer to count time $t_1$, this counter being started when the carrier sense goes off in each packet. This timer is reset by the frame clock when carrier sense goes on, and, if it is not reset until time $t_1$, a $t_1$ time-out occurs, followed by an automatic restart. Thus, $$t_1 = 2a + \beta (\alpha > \beta).$$

(2) When a station detects that the number of packets counting from the master packet plus the number of times of $t_1$ time out is equal to the value immediately preceding the packet number to be sent by that station, upon identifying carrier sense on, it sends a packet at time α thereafter. If however, the send time-out detection circuit issues a send request, the station immediately sends packets. If there is no packet immediately before, the timer will time out, and a time α after this time-out is detected, a packet will be transmitted.

Figure 25:
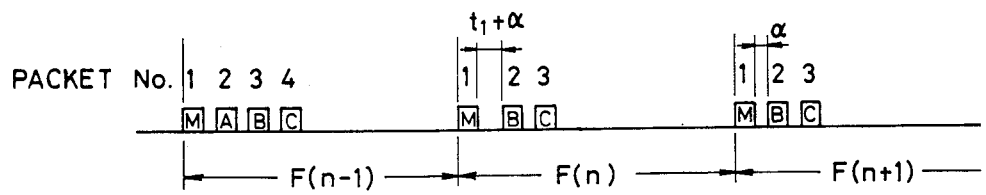

(3) The packet counters in the respective stations count the number of packets (including master packets) for each frame, starting from the master packet and continuing up to the turn of the station in packet transmission sequence. For example, as indicated in FIG. 25, the packet counter counts two for station B and three for station C over frame F(n). If a station ends transmission somewhere within the interval between transmission of the master packet and the time when the turn comes for this station to transmit a packet, the difference will be the value by which the packet counter of the station falls short of the count for the preceding frame. Thus, in the subsequent frame, a revised packet transmission sequence will be employed for packet transmission. For stations that do not transmit any packet, the packet counter counts the number of packets occurring between and including the master packets.

Figure 26:
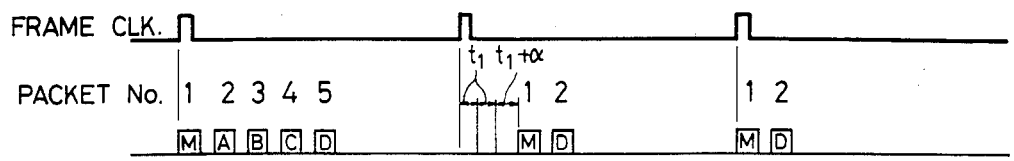

IV. When no further master packet remains to be transmitted (FIG. 26):

(1) Each station monitors the master packets, and if it cannot detect a master packet in the position where it is expected in a frame, it continues thereafter to monitor for the presence of the master packet until the time comes for packet transmission by the station. If no master packet is found, a master flag is set in the packet transmission by the station.

(2) The station which becomes the master in the next frame follows its own frame clock and transmits a master packet at the position for the #1 packet even if $CS_{ON}$ is present.

Figure 27:
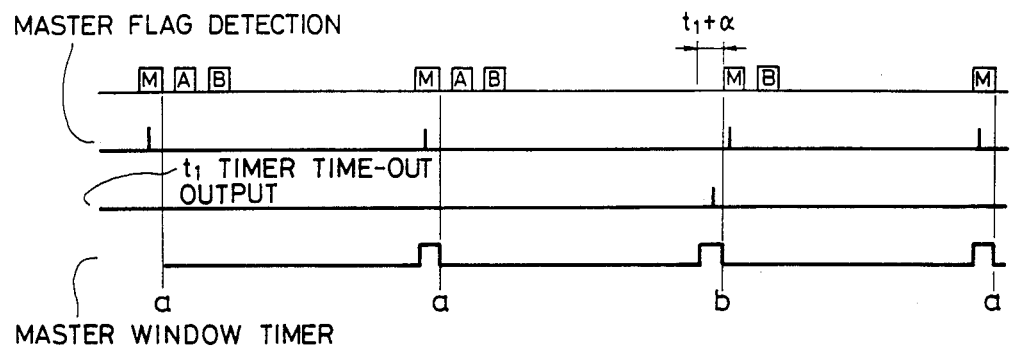

V. Detection and checking of master packets (FIG. 27):

(1) If a master packet is detected, the master window timer is started from a pre-specified point in the master packet (such as the end of the control field or the end of the packet).

(2) The master window is generated in the position where the master packet is to appear in the next frame. The master packet position changes after the transition of the master packets across the master window span. However, the master flag is set so that it can be detected even under worst-case conditions.

(3) Each station checks the presence (or absence) of the master flag within the master window.

(4) If a master flag is detected within the master window, the corresponding packet is treated as the master packet and the master window timer is reset, then restarted at a specified location in the master packet, as described in (1) above (a in the figure).

(5) If a master flag is not detected within the master window, the master packet is considered to be absent, and the periodic timer is restarted from the end of the master window (b in the figure). In third case, the end of the master window must be made to coincide with the reference point specified in (1) above.

Figure 28:
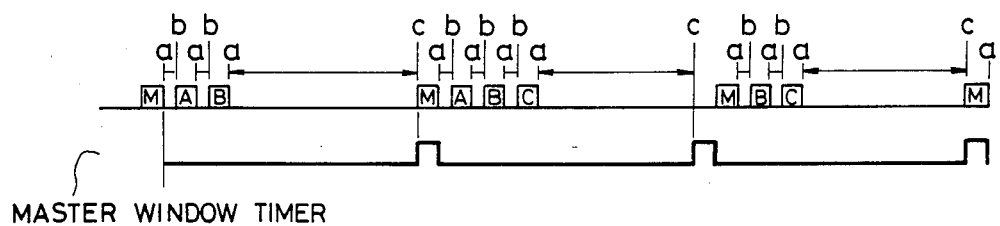

VI. Detecting empty areas (FIG. 28):

(1) Each station detects the master packets, and, when the carrier sense in a master packet goes off, starts the empty area detection counter (a in the figure).

(2) If a packet occurs in the interval up to detection of the master window of the next frame, the counter is stopped when the carrier sense of the packet goes on (b in the figure), and is reset and started when the carrier sense goes off.

(3) If a master window is detected, the counter is stopped, and the value of the counter at the moment is read (c in the figure). This value gives the empty area.

Figure 29:
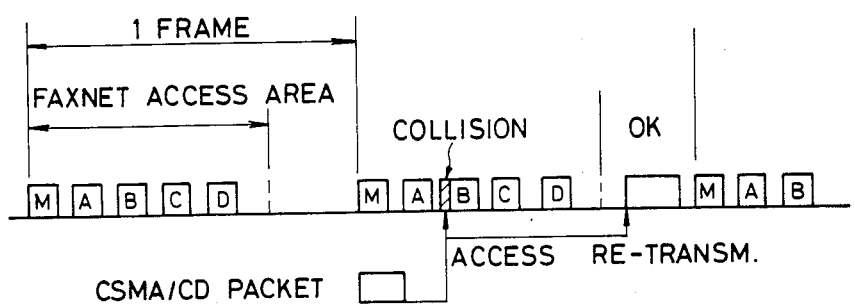
FIG. 29 is a diagram of another example of the invention.

It is also possible to restrict the area where the Faxnet packets can be transmitted within a specified period from the beginning of the frame, and to allow up to the termination of the remaining frame as the area for CSMA/CD packet transmission. For this, the transmission clock a issued by the transmission clock generator 57 is counted and a frame counter is added such that it is reset to 0 (zero) by the master detection signal from the receive logic circuit. To implement this function, what is further needed is to send, at a pre-specified value of the frame count as a sent request, inhibit signals to the transmission control circuit, and to eliminate this signal each time it is reset to 0 (zero). In this way, in the case where the packets tend to bunch, the probability of successfully transmitting CSMA/CD packets increases, and it is possible to shorten the period after which a CSMA/CD packet transmission can be accomplished successfully, that is, to shorten the transmission delay period (FIG. 29).

The master station can transmit a dummy preamble to the terminating limit of the frame if CS is off in the interval between a pre-specified frame timing to the terminating limit of the frame. The frame timing determined in advance is as follows:

frame timing = 1 frame length − maximum CSMA/CD packet length.

Figure 30:
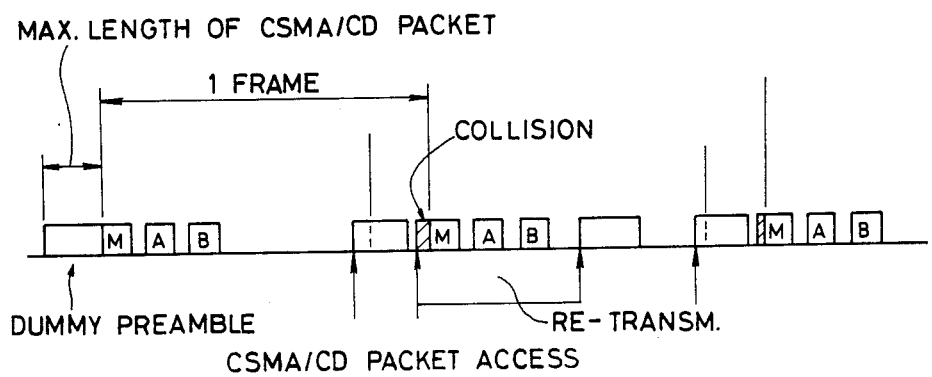
FIG. 30 is diagram illustrating yet another example of the invention.

This causes an immediate collision even if a CSMA/CD packet is transmitted in the interval from the frame timing to the terminating edge (the initial edge of the succeeding frame), inhibiting on-the-spot transmission of the packet (FIG. 30). A late collision refers to a collision that takes place after a CSMA/CD packet goes past the collision window (interval over which a collision is possible where only CSMA/CD packets are being transmitted across the cable). A late collision may occur in the case of the invention only at transmissions of master packets and after packets which have been transmitted have passed. Of these two, however, the probability of occurrence of the former is much higher than that of the latter. A late collision does not occur in a system where only CSMA/CD packets are being transmitted. Thus, as far as possible, a late collision should not occur where CSMA/CD and Faxnet communications occur simultaneously. As mentioned before, if the master staion transmits dummy preambles, the probability of late collision becomes extremely small. This can be achieved very simply by adding the frame counter and having the master station issue dummy preamble send requests to the transmission control circuit at a predetermined frame count value.

In the digital transmission system of the invention as described above, Faxnet packets are provided with a long preamble so that, even if these packets collide with CSMA/CD packets, the station transmitting the Faxnet packets does not stop transmission. Furthermore, as long as the transmitting station does not terminate transmission, a packet is invariably transmitted in each frame. In this way, the digital transmission system of the invention can transmit by assigning priority to Faxnet packets over CSMA/CD packets, making real-time transmission possible across a single cable.

Figure 1:
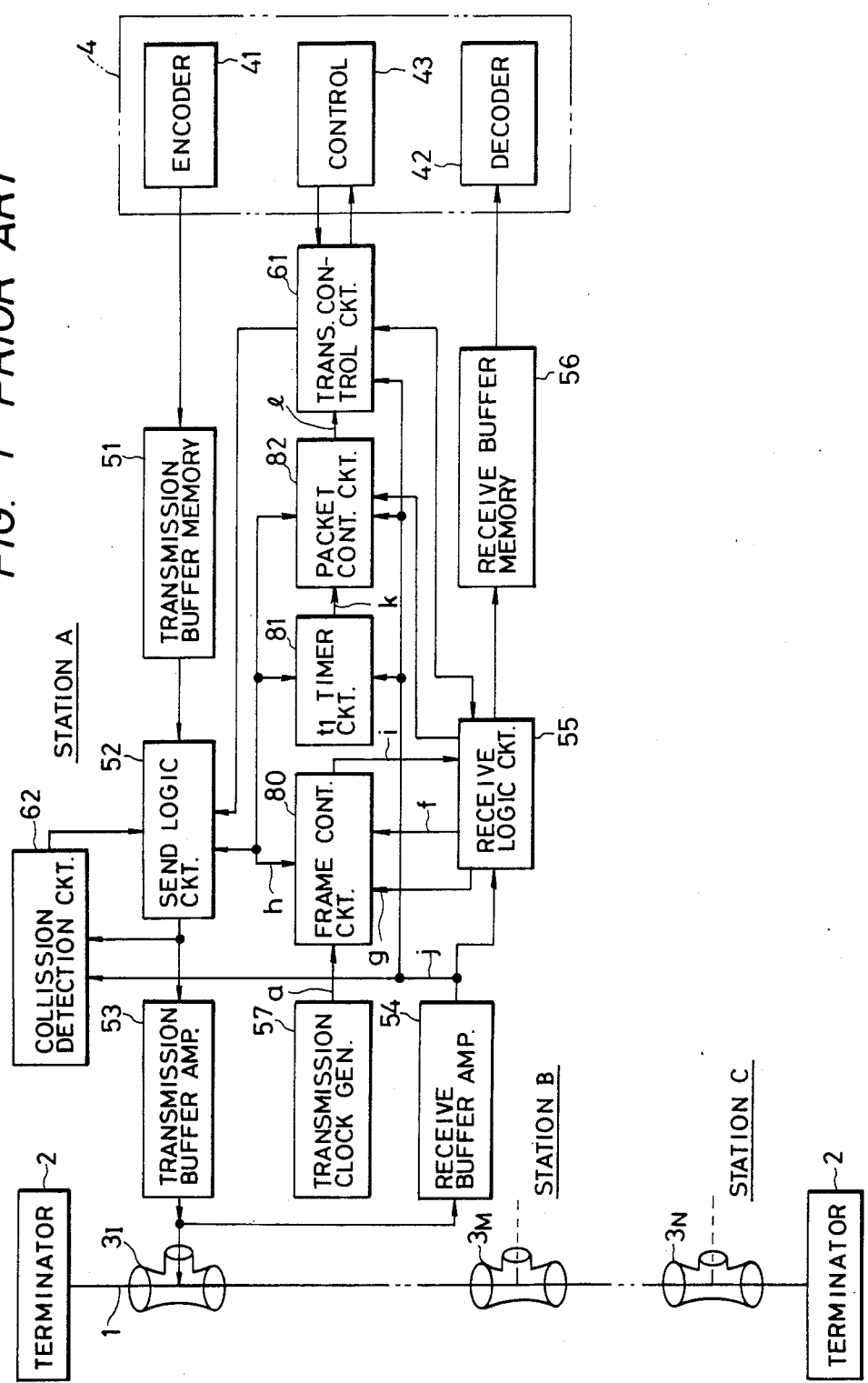
FIG. 1 is a block diagram of a conventional communications system.
Figure 2:
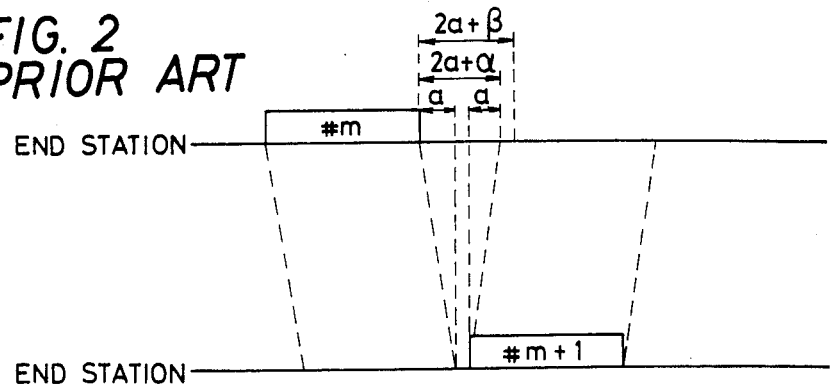
FIGS. 2 to 4 are diagrams used for explaining the principles of a conventional digital transmission system.
Figure 3:
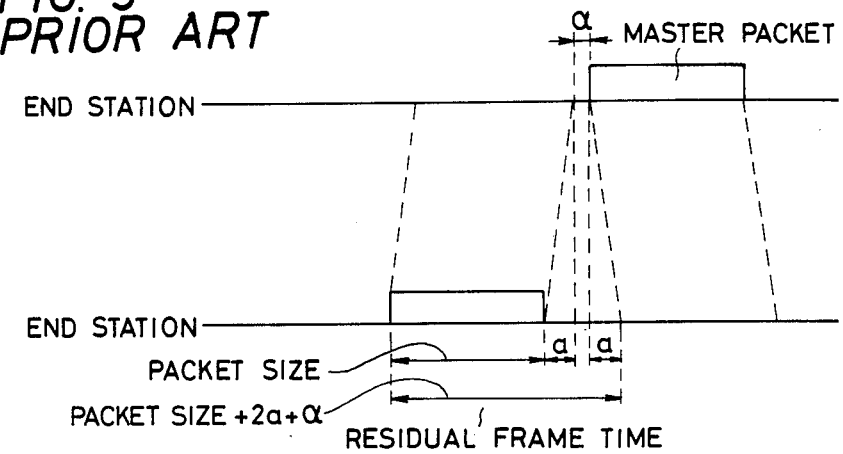
Figure 4:
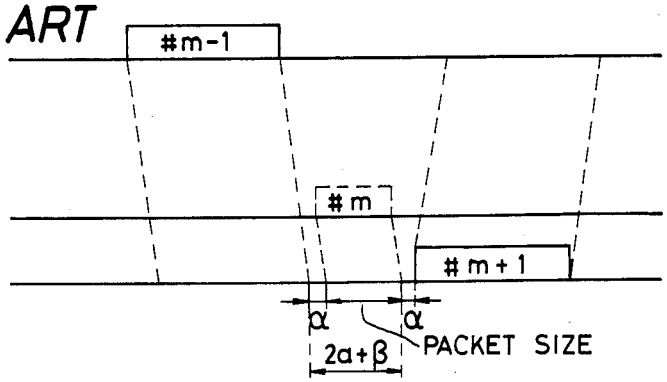
Figure 5:
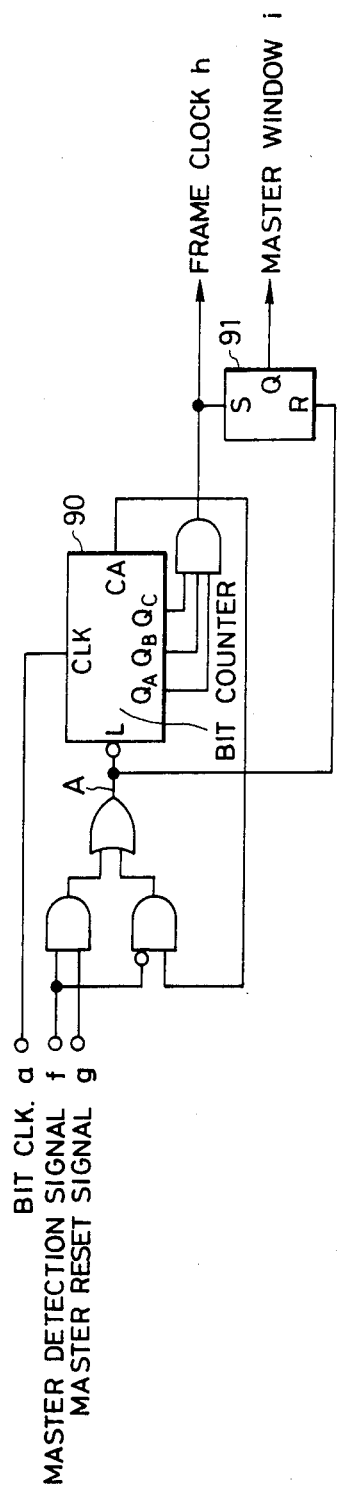
FIG. 5 is a detailed circuit diagram of a frame control circuit used in the conventional system.
Figure 6:
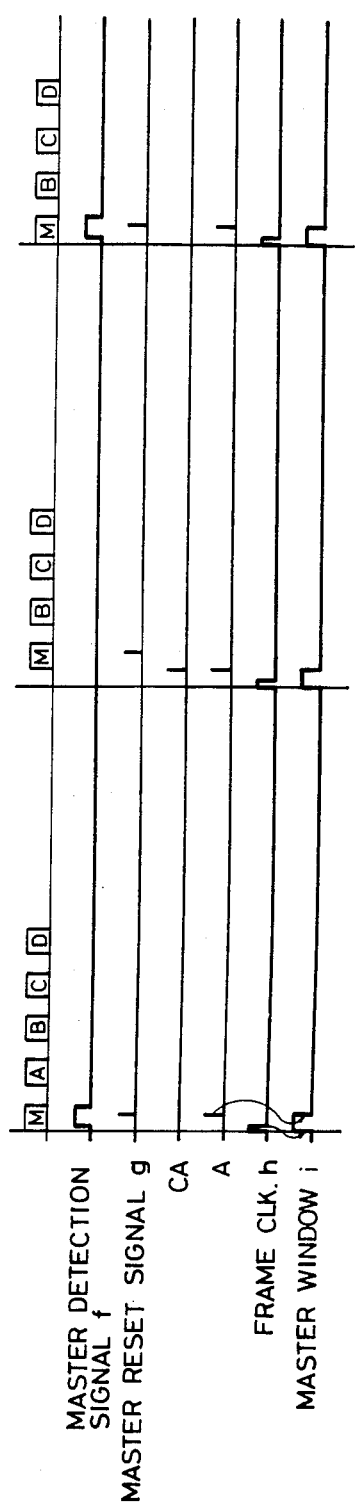
FIG. 6 is a timing chart for the frame control circuit.
Figure 7:
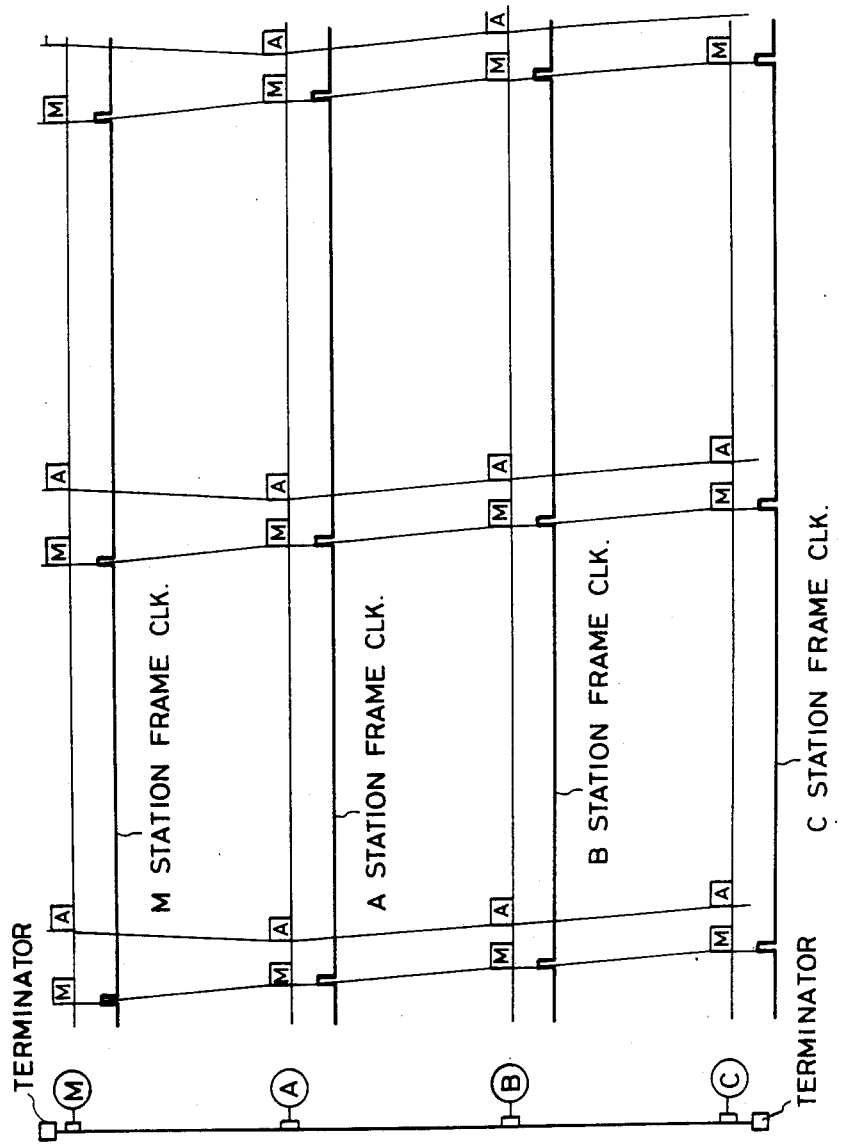
FIG. 7 is a diagram showing the relation between packet signals along a transmission channel and frame clocks in respective stations.
Figure 8:
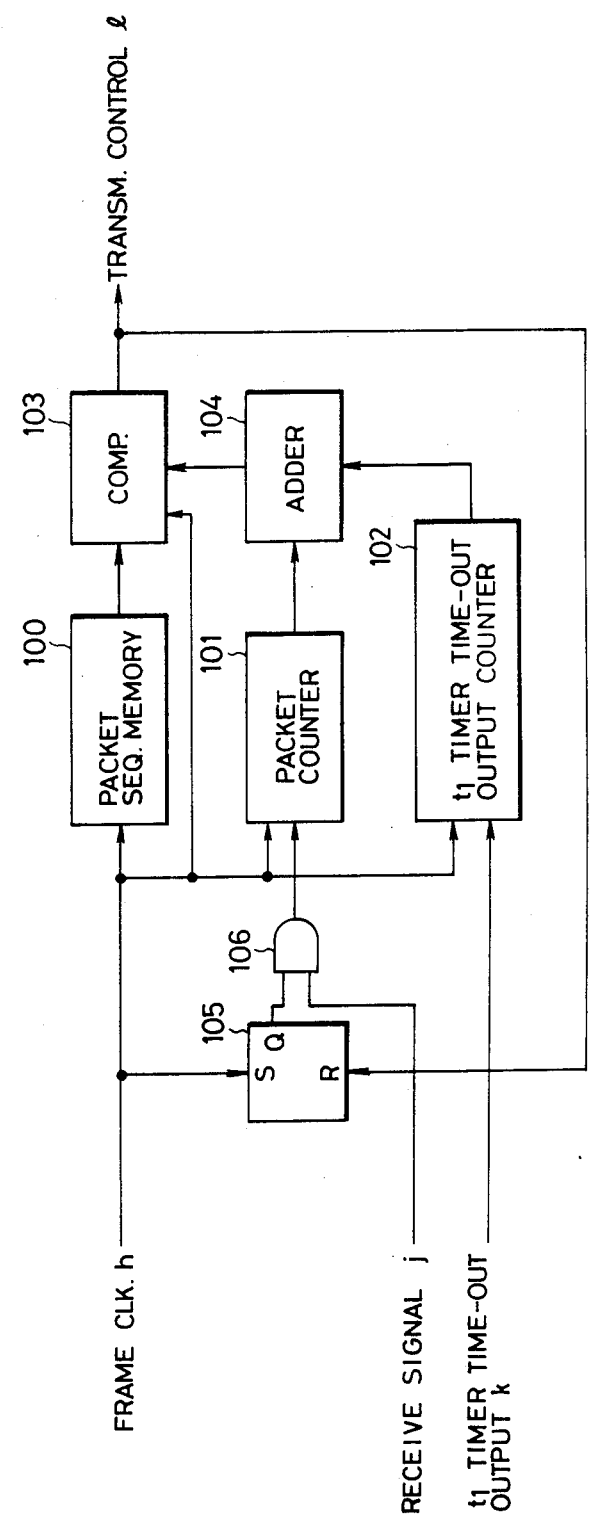
FIG. 8 is a detailed block diagram of a packet control circuit.
Figure 9:
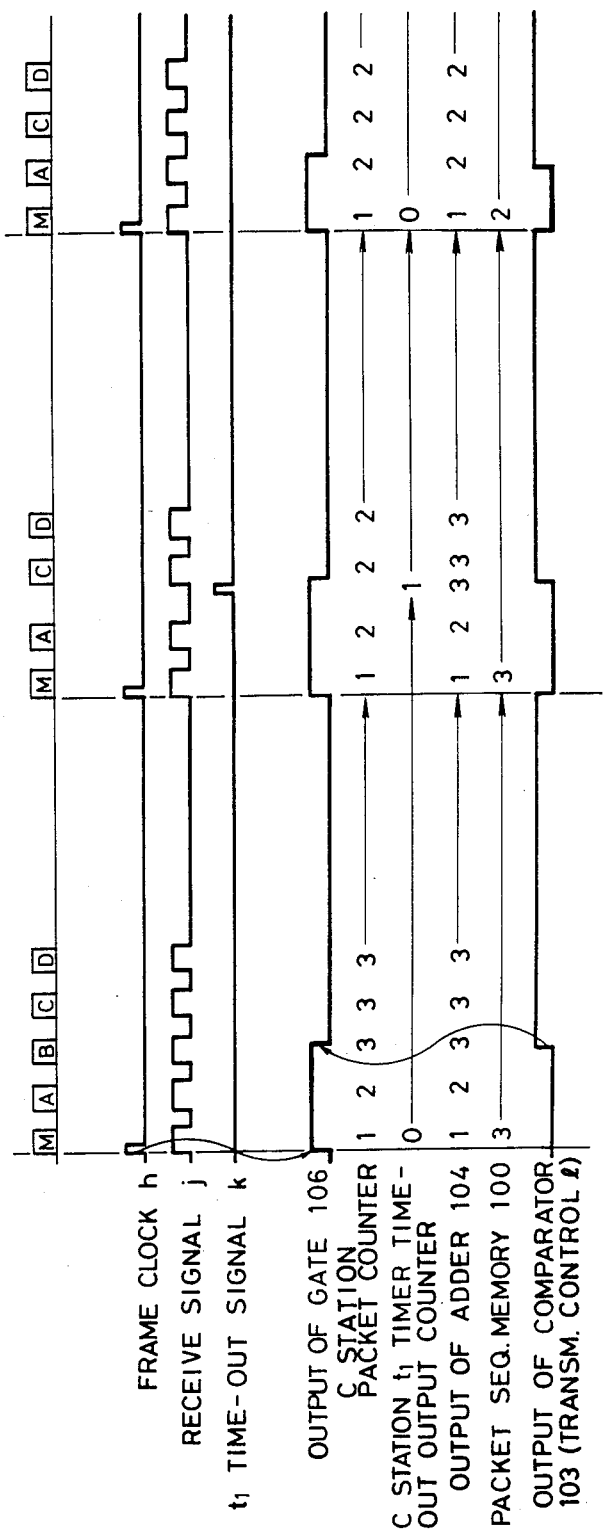
FIG. 9 is a timing chart for the packet control circuit.
Figure 10:
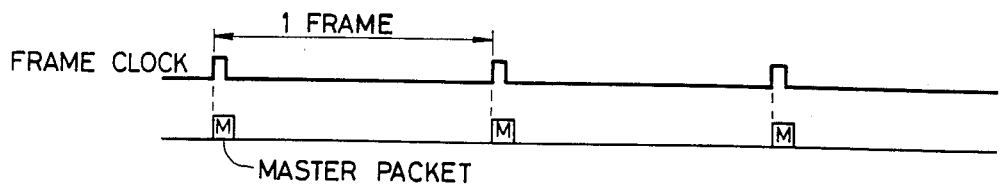
FIGS. 10 to 15 are diagrams used for explaining the principles of the conventional communications system.
Figure 11:
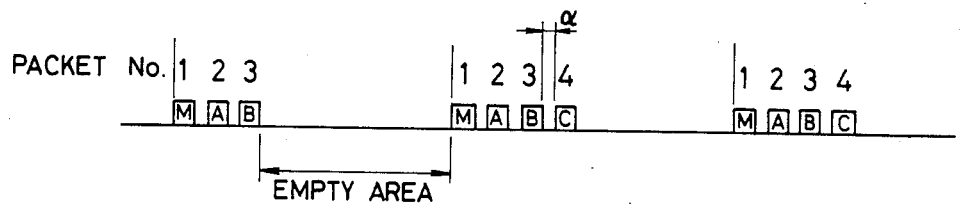
Figure 12:
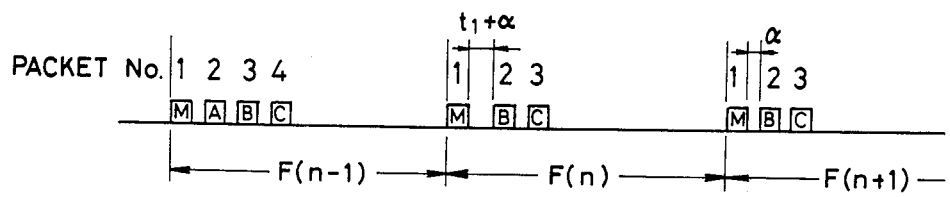
Figure 13:
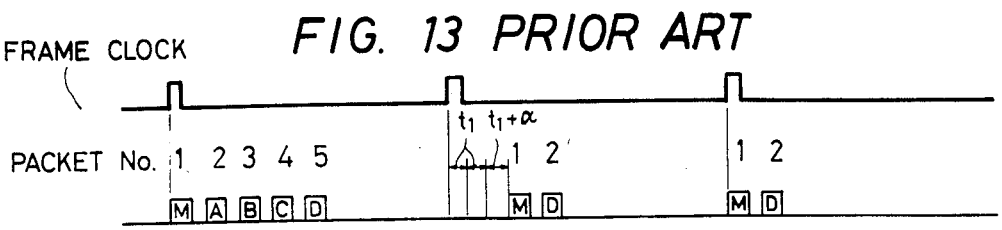
Figure 14:
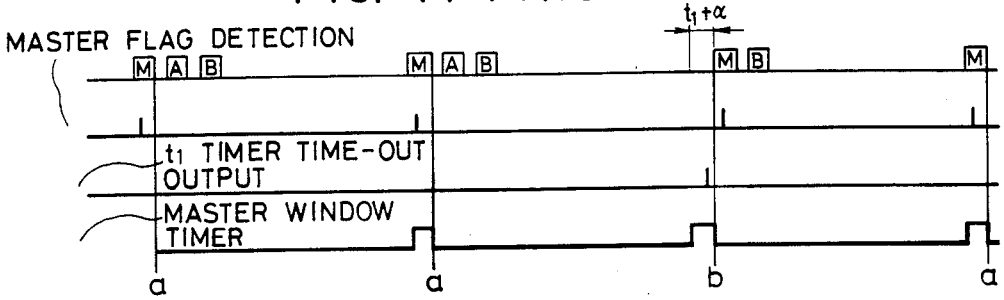
Figure 15:
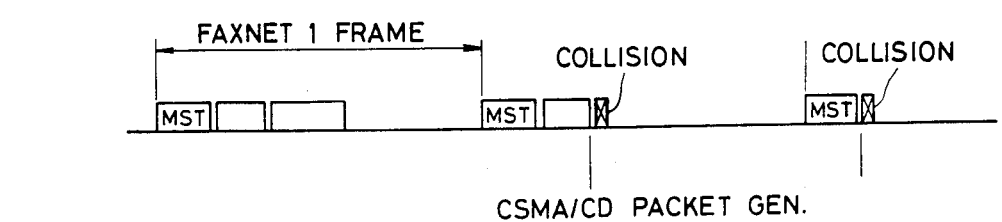
Figure 16:
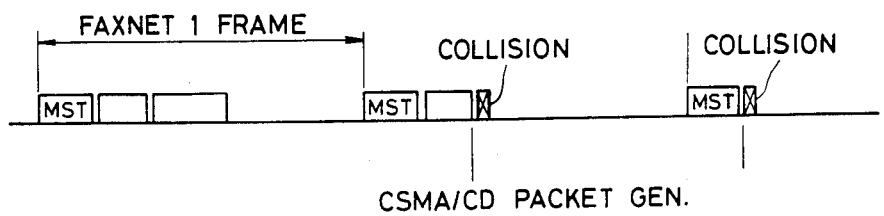
FIG. 16 is a diagram showing a collision where a conventional communications system and a CSMA/CD communications system are connected by means of a single cable.
Figure 34:
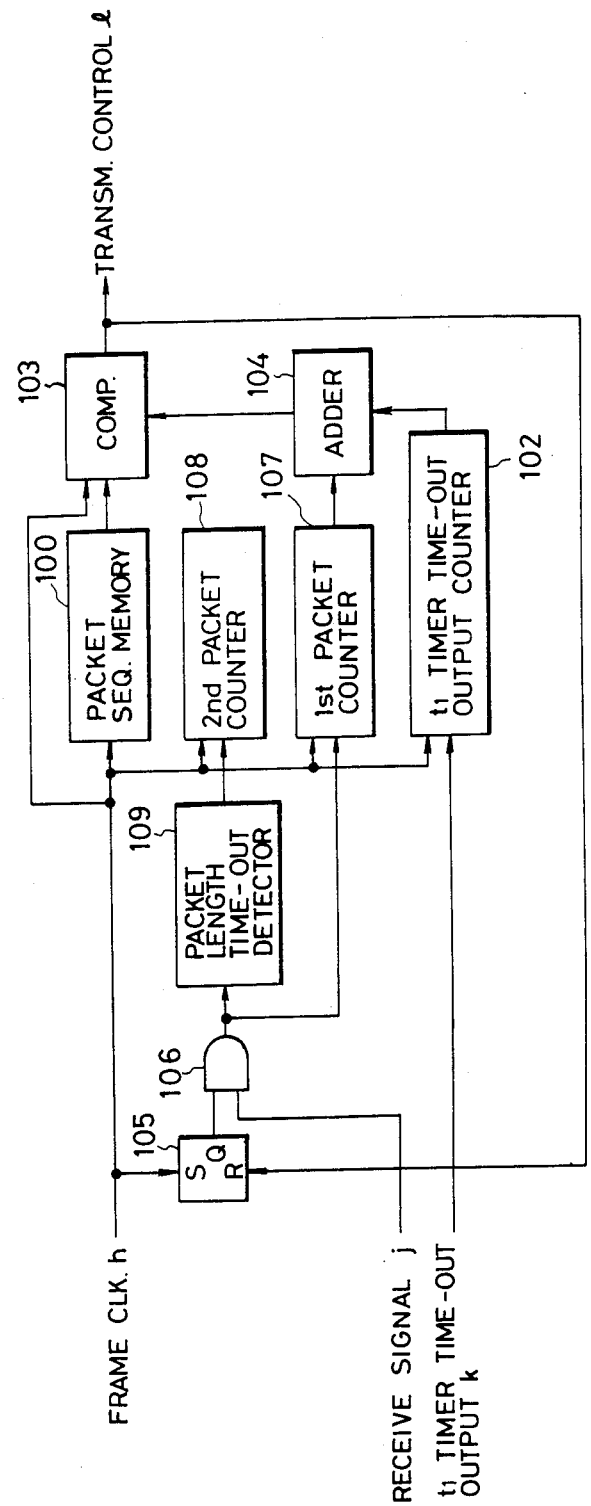
FIG. 34 is a detailed block diagram of a packet control circuit.
Figure 35:
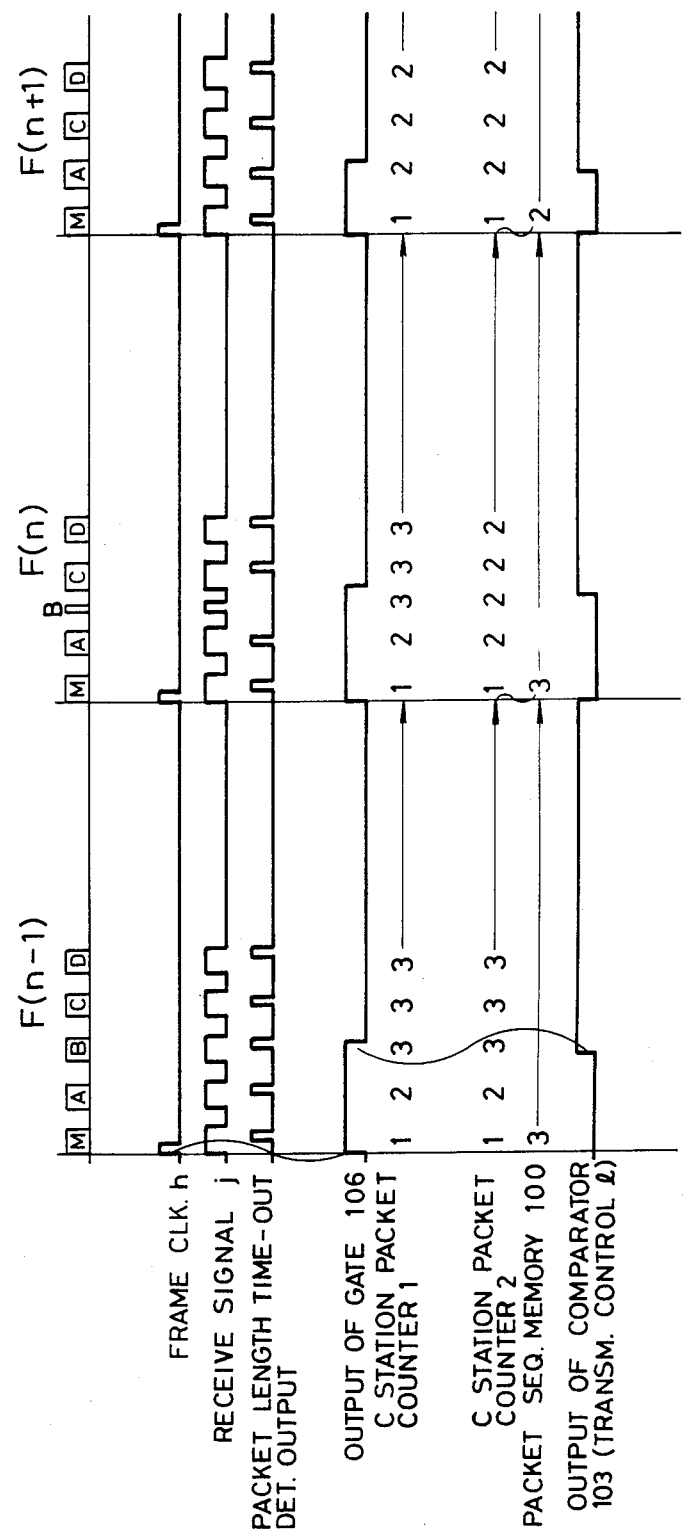
FIG. 35 is a timing chart for the packet control circuit.

A further embodiment of a line switching communications system of the invention will now be explained. The line switching communications system of this embodiment is similar in construction to the system of FIG. 1, except for the structure and operation of the packet control circuit 82. FIG. 34 shows the details of packet control circuit 82 of this embodiment. The circuit 82 is composed of a packet sequence memory 100, a No. 1 packet counter 107, a No. 2 packet counter 108, a packet length time-out detector 109, a $t_1$ timer time-out output counter 102, a comparator 103, an adder 104, a flip-flop 105, and an AND gate 106. The packets sequence memory 100 stores the scheduled sequence of transmission from the local station. The No. 1 packet counter 107 counts the number of packets within a frame, while the No. 2 packet counter counts the output from the packet length time-out detector 109. The $t_1$ timer time-out output counter 102 counts the time-out output from the $t_1$ timer. The packet length time-out detector 109 generates a time-out output if it receives a packet equal to or longer than a specified length. The adder 104 adds the count held by the No. 1 packet counter and the output from the $t_1$ timer 102. The comparator 103 then compares the sum with the sequence number of the transmission packet from the local stations and issues and output signal according to the frame clock h when the sum reaches a value immediately before the packet sequence number, that is, when it reaches the value stored in the packet sequence memory. The packet sequence memory 100 stores the No. 2 packet counter value according to the frame clock h at that time.

The following is a detailed explanation of the transmission control system. Here, the packet format is assumed to have the large preamble length as explained above.

Figure 36:
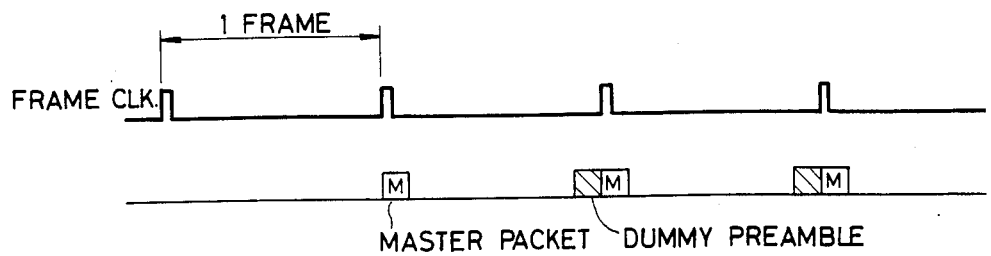
FIGS. 36 to 44 are diagrams used for explaining the principles underlying the further embodiment of the invention.

I. FIG. 36 shows the transmission packet of the station starting initial transmission when the transmission line is silent. In this instance, packets are transmitted in the following sequence:

(1) Carrier sense is monitored once within the span of a frame, and if there is no carrier sense output, packets are transmitted in a cycle agreeing with local station frame clocks. A flag is set in the control field of the transmitted to indicate that it is the master packet. The control field is also provided with an area for storage of packet sequence data. This area can carry data to indicate that this is the #1 packet.

(2) If no collision occurs outside the priority window after transmission of the initial packet meets with a collision outside the priority window, a reset is executed and carrier sense is monitored for a frame immediately before packet transmission, and the packet is retransmitted in accordance with whether there is or is not a carrier sensed.

Figure 37:
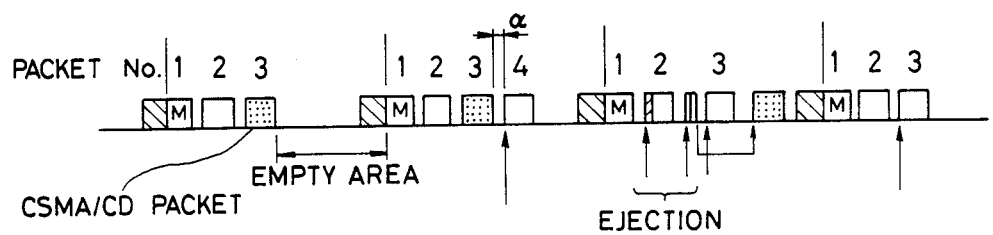

II. If there is a signal on the transmission line, the operation proceeds as follows (FIG. 37):

II-1. If a master packet is detected:
  (1) The master packet is detected and the No. 2 packet counter is used to count the number of packets with a length exceeding a specific value including and following the master packet, and this is stored in the packet count memory at the point where the master window explained detail below is detected in the next frame.
  (2) Blank areas are detected and a check is made to evaluate if the following condition is satisfied: Empty area=(packet size+2a+$\alpha$).
  (3) If the check in (2) shows the occurrence of an empty area, the No. 1 packet counter is used to count, in the next frame, the number of packets from the master packet, and, when the number of packets stored in the memory during the last frame is reached, carrier sense off is detected for the packet and packets are then transmitted for a total period of $\alpha$.
  (4) If a collision occurs outside the priority window after packet transmission, a reset is performed and the operation is retried.
  (5) If a packet is successfully transmitted, the CSMA/CD packet is ejected in the next frame whereafter, until there is no more packets to be transmitted, packets are continuously transmitted for each frame (the CSMA/CD packet ejection processing is described below).
  (6) If a local station transmits a packet, the station that completes tranmsission performs procedure II at times.

II-2. If a master packet is not detected:
  (1) The next frame is monitored, and if no carrier send output is found, procedure I is followed. If the master packet is detected, procedure II-1 is followed. If the master packet is not detected, the procedure from (2) onwards is followed. The purpose of monitoring one more frame at this time is to eliminate the possibility of failure to detect the master packet because of monitoring only one frame during the transition time at the master station.
  (2) Packets are transmitted periodically according to the frame clocks from the local stations. A flag is then set in the control field of the packet sent to indicate that the packet is a master packet. Otherwise, an area can be provided in the control field to indicate the packet sequence, indicating in this area that this is the #1 packet.
  (3) If the initially transmitted packet does not collide with a packet from another station outside the priority window, a dummy preamble is transmitted according to the frame block, followed by transmission of the master packet.
  (4) If the initially transmitted packet meets with a collision outside the priority window, a reset if performed, carrier sense is monitored over the frame immediately preceding the transmission of the packet transmission, and, depending upon whether a carrier is present or not, the procedure for packet transmission is determined.

Figure 38:
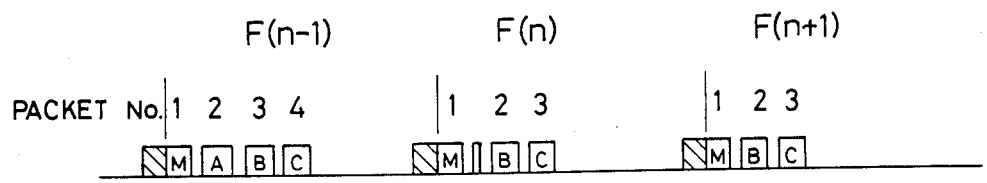

III. When a station has completed packet transmission:
  (1) A station that intends to end packet transmission does so after transmitting a packet of a specific length $(2a+\gamma)$, where $\gamma$ has an arbitrarily selected value. Transmission does not stop even if this packet meets with a collision.
  (2) Each station is equipped with a packet length time-out detector ($t_2$ timer) which starts when the carrier sense is on in the respective packets. The timer is reset when the carrier sense is off and issues a packet length time-out if it is not reset even after $t_2$ times out. Here $t_2=4a+\gamma$.
  (3) When a station detects, counting from the master packet, that the number of packets is equal to the value immediately preceding the packet number to be sent by that station (this number is the sum of the value contained in the No. 1 packet counter and the number of time-outs counted by the $t_1$ timer), that is, when the number coincides with the value in the packet sequence memory, carrier sense off is identified a packet is sent a time $\alpha$ thereafter. (The packet number is related to the value in the packet sequence memory as follows: packet number=(packet sequence memory value)+1).
  (4) The No. 2 packet counter in the respective stations calculates the number of packets (including the master packets) of length $t_2$ for each frame, starting from the master packet and continuing up to the turn of the station in packet transmission sequence. For example, in FIG. 38, the No. 2 packet counter counts two for stations B and three for station C over frame $F(n-1)$. If a station ends transmission somewhere within the interval between transmission of the master packet and the time when the turn comes for this station to transmit its packet, the difference will be the value by which the No. 2 packet counter of the station falls short of the count for the preceding frame. Since station B→>1, and station C→>2, in the subsequent frame, the revised packet transmission sequence will be employed for packet transmission. For stations that do not transmit any packet, the No. 2 packet counter counts the number of packets having a length of $t_2$ or more occurring between and including the master packets.
  (5) Each station is equipped with a frame clock and timer to count time $t_1$, this counter being started when carrier sense goes off in each packet. This is done for the case of stations that stop transmission without transmitting a packet informing of the end of transmission (the operation described in (1)) because of a failure during transmission. This timer is reset at the frame clock when carrier sense goes on, and, if it is not reset until time $t_1$, a $t_1$ time-out occurs, followed by an automatic restart. Thus, $t_1=2a+62$. The time-out output of the $t_1$ timer is made use of also when an empty area is detected (as described below).
  (6) The master station transmits a packet informing of the end of transmission following transmission of the dummy preamble.

Figure 39:
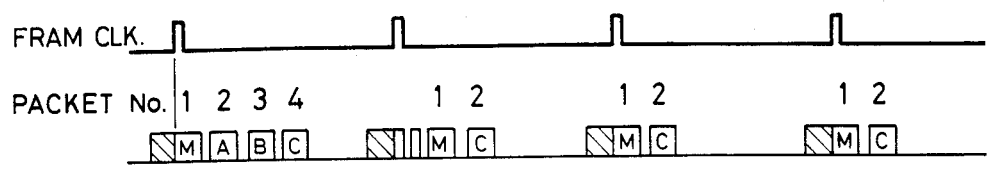

IV. When no further master packet remains to be transmitted (FIG. 39):
  (1) Each station monitors the master packet, and if it cannot detect the master packet in the position where it is expected in a frame, it continues thereafter to monitor for the presence of master packets until the time comes for packet transmission by the station. If no master packet is found, the master flag in the packet transmitted by the station is set before transmission.
  (2) The station which becomes the master in the next frame follows its own frame clock and transmits a dummy preamble and a master packet at the position for the #1 packet.

Figure 40:
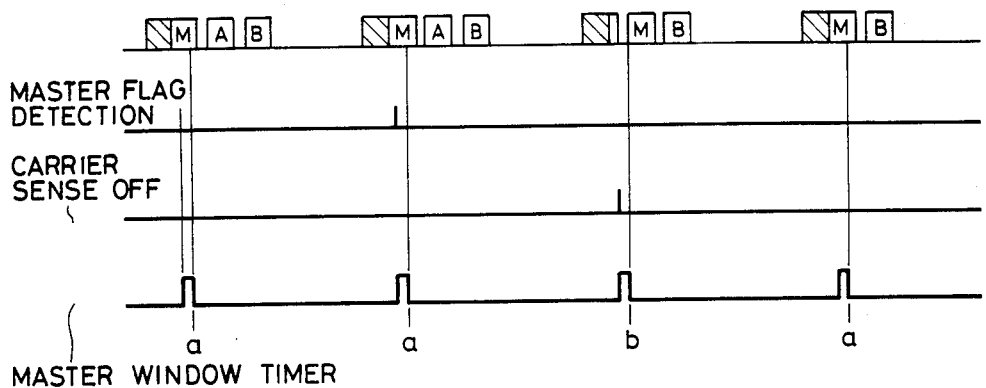

V. Detection and checking of master packets (FIG. 40):
  (1) If a master packet is detected, the master window timer is started from a specified point in the master packet (such as the end of the control field or the end of the packet).

(2) The master window is generated in the position where the master packet is to appear in the next frame. The master packet position changes after the transition of the master packets across the master window span. Even if the change is slow, the master flag can be detected.

(3) Each station checks the presence (or absence) of the master flag within the master window.

(4) If the master flag is detected within the master window, the corresponding packet is treated as the master packet and the master window timer is reset then restarted at a specified location in the master packet, as described in (1) (a in the figure).

(5) If the master flag cannot be detected within the master window, or if the carrier sense goes off, the master packet is considered to be absent, and the periodic timer is restarted from the end of the master window (d in the figure). In this case, the end of the master window must be made to coincide with the reference point specified in (1).

Figure 41:
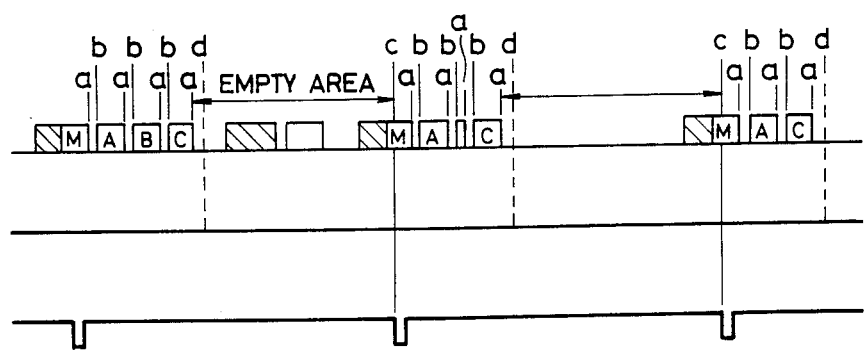
Figure 42:
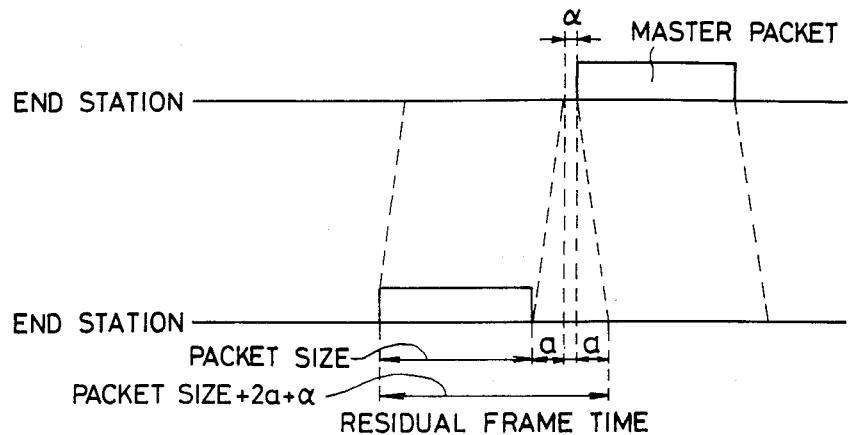

VI. Detecting empty areas (FIG. 41):

(1) Each station detects the master packets, and, when the carrier sense in a master packet goes off, starts the empty area detection counter (a in the figure).

(2) If a packet occurs in the interval up to detection of the master window of the next frame, the counter is stopped when the carrier sense of the packet goes on (b in the figure) and is reset and is started when the carrier sense goes off.

(3) If a master window is detected, the counter is stopped and the value contained by the counter at the moment is read (c in the figure). This value specifies the empty area. However, the empty area detection counter is not reset until detection of a master window where there is a $t_1$ timer time-out output (d in the figure). This is because packets after the $t_1$ timer times out are assumed to be CSMA/CD packets and are counted as empty area. That is, the CSMA/CD packets do not occupy any area in the next frame.

The above description relates to the digital signal transmission system of the invention. The following is a description of the signals used in this system.

The value of represents the transmission delay period between stations where the delay occurs. The time $\alpha$ is a value determined by hardware considerations and is set to maintain the necessary interval between the packets. In other words, this time is determined by, respectively, the time required after passing the last bit of the packet in the channel for the channel to recover its silent voltage level, and the time required by the receive logic circuit in the other station for recovery to the reception enable status after processing the received packet.

The dummy preamble referred to in I(2) is transmitted to prevent transmission of CSMA/CD packets at the termination of a frame. Normally, this preamble is transmitted by the master stations. Transmission of the preamble is timed between the frame timing (given by frame timing=length of frame−length of largest CSMA/CD packet) and the end of the frame when $C_{ON}$ changes to $CS_{OFF}$. The dummy preamble is transmitted until the end of the frame. As a result, no CSMA/CD packet is transmitted during the period.

Provision is made to avoid overlapping of a packet with the master packet at the head of the next frame where an attempt is made to access the channel at the end of a frame in II-1(2). In other words, as in FIG. 20, the remaining frame time must be equal to packet size $+2a+\alpha$. The expression in II-1(2) gives the limiting conditions determined accordingly.

The CSMA/CD type packet ejection is II-1(5) is intended to avoid transmission of CSMA/CD packets in the interval from the master packet to the packet sent by the station concerned. When a station newly starts transmission, it is not known whether all the packets between the master packet and the packet transmitted by the station are Faxnet packets. The above processing, therefore, is performed at the start of transmission to make sure that Faxnet packets only only lined up in succession. This is because if there is present one or more CSMA/CD packets within the Faxnet packets, there is a possibility of a long packet transmission in the following frame and the Faxnet packets may be thrust out of the frame.

The following is a more detailed description of this processing.

Between the master packet and the turn of a station in the transmission sequence, the ejection signal is transmitted each time CSMA goes off. As in the case of the packets, this transmission is timed within an interval of $t_2$ after CS goes off. The length of the ejection signal is $(\gamma_1+\gamma_2)$. This ejection processing is possible whether or not transmission is stopped when a collision is detected. All CSMA/CD packets transmitted up to the time when the turn of the station comes in the transmission sequence collide with this ejection signal, whereby their transmission is topped. On the Faxnat packets, however, the ejection signal has no effect. Since all CSMA/CD packets are ejected between the master packet and the packet transmitted by the frame undergoing this treatment, if a packet is transmitted to the following frames when the turn comes for this frame in the transmission sequence, only Faxnet packets will be transmitted in a continuous string.

In II(1), the end of transmission is informed to all Faxnet stations by transmitting packets sufficiently short in size that they do not register in the packet length time-out detectors in the respective stations.

Figure 43:
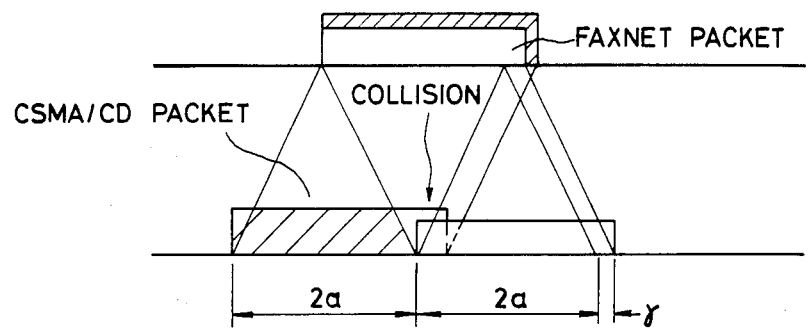

Time $t_2$ in II(2) is determined from the maximum $CS_{ON}$ time where a collision occurs between the packet informing the end of transmission and a CSMA/CD packet (FIG. 43).

It is clear from the above that the packets in this system must be larger in size than $t_2$, that is, packet size $t_2=4a+\gamma$.

Figure 44:
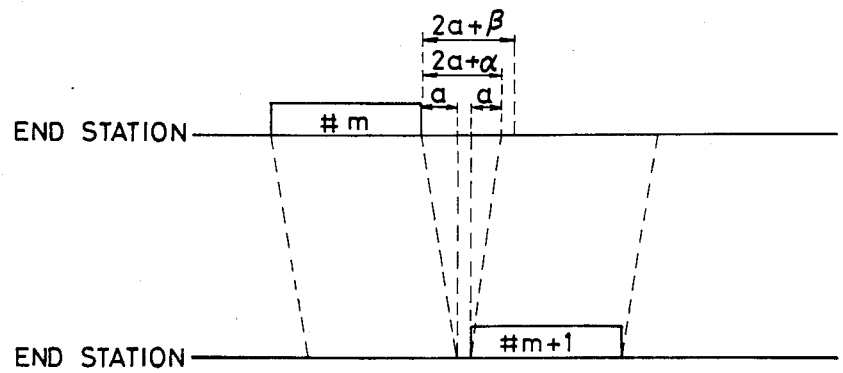

The value $2a+\beta$ for time $t_1$ in (5) is determined as follows:

Let it be assumed, in FIG. 44, that the last station on the cable has transmitted the m-th packet and that the opposite station (at the other end of the cable) has transmitted the (m+1)-th packet. In this case, all the stations will definitely detect the initial bit of the m-th packet in time $2a+\alpha$ from the detection of this packet by the (m+1)-th packet.

If this cannot be detected, that is, if silence prevails even after time $2a+\alpha$, all the stations understand that the (m+1)-th packet has ended. This makes the (m+2)-th packet occupy the position of the (m+1)-th packet in the sequence so that the sequence of the following packets advances by one position for each packet.

Furthermore, if $\beta>\alpha$, and $2a+\beta$ is greater than $2a+\alpha$, then silence over a period of $2a+\beta$ implies silence over a period of $2a+\alpha$ as well.

It is possible to restrict the area where the Faxnet packets can be transmitted within a specified period from the beginning of the frame and to allow up to the termination of the remaining frame as the area for CSMA/CD packet transmission. For this, the pulser of the transmission clock is issued by the transmission clock generator 57 are counted and a frame count added (which is reset to 0 (zero) by the master detection signal from the receive logic circuit). To execute this function, what is further required is to send at a prespecified value of the frame count, as a send request, inhibit signals to the transmission control circuit, and to eliminate this signal each time it is rseset to 0 (zero). In this way, in the case where the packets tend to bunch, the probability of successfully transmitting CSMA/CD packets increases, and it is possible to shorten the period after which a CSMA/CD packet transmission can be accomplished successfully, that is, to shorten the transmission delay period.

Again, by making the maximum Faxnet packet length equal to the maximum packet length used in the CSMA/CD system, it is possible to dispense with the necessity of the empty area detection function. This is because, even if a Faxnet station makes an attempt to transmit a packet at the termination of the frame, this packet collides with the dummy preamble sent by the master station and is automatically prevented from being transmitted.

A case of co-occurrence will be considered with the CSMA/CD system where the interval is long between detection of $CS_{OFF}$ at package termination and the actual transmission of a packet by the concerned station. If, for example, this interval is longer than $2a+\beta$, no collision can occur between the Faxnet packet immediately following the End of Carrier (EOC) and the CSMA/CD packet. This is because the Faxnet packet is transmitted earlier and the CSMA/CD station detects the corresponding carrier and then halts the transmission attempt. For this reason, a length $\tau_3$ is sufficient for the preamble of a Faxnet packet where it coexists with the CSMA/CD. It is also required to prevent stopping of packet transmission even if a collision occurs.

It is also possible to set a flag in the control field of the transmission end time packet and transmit it to inform of the end of transmission to the respective stations. It is not needed in this instance to transmit a dummy signal of a specified length to inform of the end of transmission.

Reliability may be improved further by providing a transmission time-out detection circuit to generate transmission request signals to request unconditional transmission where no signal transmission is possible over a frame after transmission of the proposed digital signal, and a receive time-out detection signal to generate receive request signal to request unconditional starting of reception if no signal is received by a station over a frame after reception of the digital signal sent to the station. This to a large extent helps prevent failure in a station to commuate with another station.

I claim:

1. In a digital signal transmission system having a plurality of individual stations coupled to a communications cable via taps, said stations transmitting time-division multiplexed digital signals on said communications cable with fixed time positions being assigned to said signals within periodically repeated time base frames, said frames being subjected to further divisions so that individual ones of said stations transmit packets which occupy specific time periods in said frame, some of said signals being from stations operating in a first mode, in which collisions between data packets transmitted from different stations are detected and the transmitting stations retry transmission after waiting a predetermined interval, and others of said signals being from stations operating in a second mode, in which collisions between data packets transmitted from different stations are detected and the transmitting stations retry transmission according to whether or not a carrier is present, the improvement comprising: in said stations operating in said second mode, send logic circuit means for preventing stopping of digital signal transmission from a station even if a collision occurs with a signal transmitted from said station in said first mode; and receive logic circuit means for preventing stopping of digital signal reception even if a collision is detected after start of digital signal reception.

2. The digital signal transmission system as defined in claim 1, further comprising: sending time-out detection circuit means for generating send request signals to request transmission if signal transmission is not possible over a frame after a digital signal transmission; and receiving time-out detection circuit means for generating receive request signals to request unconditional start of request if it is not possible to receive signals addressed to a local one of said stations over a frame after reception of digital signals addressed to said local one of said stations.

3. The digital signal transmission system as defined in claim 1, further comprising means for specifying a station as a master station to serve as a reference for frame synchronization from a timing determined on a basis of a maximum permissible length of a digital signal in said first mode, such that said master station transmits dummy digital signals from a time of detection of a carrier sense off to an edge of each of said frames.

4. The digital signal transmission system as defined in claim 3, further comprising means for permitting transmission of digital signals only to a time period from an initial edge of each of said frames to a predetermined time by inhibiting signal requests from all but said master station between said predetermined time and an end of said frame.

5. In a digital signal transmission system having a plurality of individual stations coupled to a communications cable via taps, said stations transmitting time-division multiplexed digital signals on said communications cable with fixed time positions being assigned to said signals within periodically repeated time base frames, said frames being subjected to further divisions so that individual ones of said stations transmit packets which occupy specific time periods in said frame, some of said signals being from stations operating in a first mode, in which collisions between data packets transmitted from different stations are detected and the transmitting stations retry transmission after waiting a predetermined interval, and others of said signals being from stations operating in a second mode, in which collisions between data packets transmitted from different stations are detected and the transmitting stations retry transmission according to whether or not a carrier is present, the improvement comprising: in said stations operating in said second mode, means for transmitting a dummy signal of a specific length by a station which is about to complete transmission of signals, said dummy signal being directed to a position in a time period which is sequentially assigned to said station in a frame next to a last digital signal which said station has transmitted, thereby informing all other stations that said station is ending use of a time period which it has been occupying.

6. The digital signal transmission system as defined in claim 5, further comprising: a master station specified as a reference station for frame synchronization, said master station comprising means for transmitting a dummy signal from a time a carrier sense off is detected to an end of a frame within àn interval from a timing determined by a maximum digital signal length permitted in a first mode, in which collisions between data packets transmitted from different stations are detected and the transmitting stations retry transmission after waiting a predetermined interval, to an end of said frame, thereby preventing transmission of digital signals in said first mode.

7. The digital signal transmission system as defined in claim 5, further comprising: sending logic circuit means, and receiving logic circuit means, said sending logic circuit means preventing stopping transmission of digital signals from a station even if said digital signals collide with digital signals in said first mode transmitted by said station, and said receiving logic circuit means preventing stopping of reception of digital signals even if a collision is detected after start of reception of said digital signals.

8. The digital signal transmission system, as defined in claim 5, further comprising: No. 1 counter means for counting signals received at a station, stopping its counting operation at a transmission timing of said station, and being reset once in each frame; No. 2 counter means for counting receive signal sequal to or exceeding a specified length, stopping counting at a transmission timing of said station, and being reset once in each frame; and a memory storing a count value of said No. 2 counter for each frame, wherein signal transmission starts when a value in said memory and a value in said No. 1 counter coincide.

9. The digital signal transmission system, as defined in claim 7, wherein: each of said stations comprises means for, when attempting to newly begin transmission of signals and succeeding in transmitting an initial signal, transmitting signals within an interval from a signal transmitted by a master station in a next succeeding frame to a time of a turn of said station in transmission sequence.

10. The digital signal transmission system as defined in claim 5, wherein: said cable is a single cable upon which signals in said first mode are transmitted, and further comprising means for inhibiting transmitting of signals in said first mode if a digital signal is detected in an interval starting from detection, if any, of an End of Carrier (EOC) and continuing for time, which is at least double a transmission delay time between most remotely situated stations.

11. The digital signal transmission system as defined in claim 5, further comprising means for inhibiting transmission requests from all but a master station during a period starting from a specified timing to an end of a frame, and permitting transmission of only digital signals in a period from a start of a frame to said specified timing.

* * * * *